(12) United States Patent
Maleki et al.

(10) Patent No.: US 11,778,559 B2
(45) Date of Patent: Oct. 3, 2023

(54) METHODS FOR PHYSICAL DOWNLINK CONTROL CHANNEL (PDCCH) BASED WAKE UP SIGNAL (WUS) CONFIGURATION

(71) Applicant: Telefonaktiebolaget LM Ericsson (publ), Stockholm (SE)

(72) Inventors: Sina Maleki, Malmö (SE); Ali Nader, Malmö (SE); Andres Reial, Lomma (SE); Ajit Nimbalker, Fremont, CA (US); Yutao Sui, Solna (SE); Niklas Andgart, Södra Sandby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 167 days.

(21) Appl. No.: 17/600,384

(22) PCT Filed: Apr. 2, 2020

(86) PCT No.: PCT/SE2020/050349
§ 371 (c)(1),
(2) Date: Sep. 30, 2021

(87) PCT Pub. No.: WO2020/204804
PCT Pub. Date: Oct. 8, 2020

(65) Prior Publication Data
US 2022/0182936 A1 Jun. 9, 2022

Related U.S. Application Data

(60) Provisional application No. 62/828,126, filed on Apr. 2, 2019.

(51) Int. Cl.
*H04W 52/02* (2009.01)
*H04W 72/23* (2023.01)

(52) U.S. Cl.
CPC ... *H04W 52/0229* (2013.01); *H04W 52/0216* (2013.01); *H04W 52/0219* (2013.01); *H04W 52/0235* (2013.01); *H04W 72/23* (2023.01)

(58) Field of Classification Search
CPC .................. H04W 52/0229; H04W 52/0219
See application file for complete search history.

(56) References Cited

U.S. PATENT DOCUMENTS

2017/0238314 A1* 8/2017 Zhang .................. H04W 72/23
370/336
2017/0325167 A1* 11/2017 Lu ..................... H04W 52/0235
(Continued)

FOREIGN PATENT DOCUMENTS

WO 2018126992 A1 7/2018
WO 2020064930 A1 4/2020

OTHER PUBLICATIONS

International Search Report and Written Opinion dated Jul. 17, 2020 for International Application No. PCT/SE2020/050349 filed Apr. 2, 2020, consisting of 8-pages.
(Continued)

*Primary Examiner* — Dominic E Rego
(74) *Attorney, Agent, or Firm* — Christopher & Weisberg, P.A.

(57) ABSTRACT

According to one aspect of the disclosure, a network node is provided. The network node is configured to configure each wireless device in a first group of wireless devices comprising at least one wireless device with a first radio network temporary identifier, RNTI, defined to address a group of wireless devices for physical downlink control channel, PDCCH, based wake-up signal, WUS, operation, and cause transmission of signaling including a wake-up signal, WUS, for a first WUS monitoring occasion associated with the first group of wireless devices, where the WUS is configured to
(Continued)

cause each wireless device in the first group of wireless devices to perform at least one action.

22 Claims, 12 Drawing Sheets

(56) References Cited

U.S. PATENT DOCUMENTS

2020/0229093 A1* 7/2020 Ahmad ............ H04W 52/0216
2020/0314755 A1* 10/2020 Sarkis ............... H04W 52/0229

OTHER PUBLICATIONS

3GPP TS 38.101-4 V0.2.0; 3rd Generation Partnership Project; Technical Specification Group Radio Access Network; NR; User Equipment (UE) radio transmission and reception; Part 4: Performance requirements (Release 15), Nov. 2018, consisting of 185-pages.
3GPP TS 38.211 V15.3.0; 3rd Generation Partnership Project; Technical Specification Group Radio Access Network; NR; Physical channels and modulation (Release 15), Sep. 2018, consisting of 96-pages.
3GPP TS 38.321 V15.3.0; 3rd Generation Partnership Project; Technical Specification Group Radio Access Network; NR; Medium Access Control (MAC) protocol specification (Release 15), Sep. 2018, consisting of 76-pages.
3GPP TSG RAN WG1 Meeting #88bis R1-1704282; Title: Consideration on 'wake-up signal' for eFeMTC; Agenda Item: 7.2.6.2; Source: Huawei, HiSilicon; Document for: Discussion and decision; Date and Location: Apr. 3-7, 2017, Spokane, USA, consisting of 4-pages.
3GPP TSG-RAN WG1 Meeting #95 R1-1813183; Title: Triggers of NR UE power saving; Agenda Item: 7.2.9.2.2 Source: Ericsson; Document for: Discussion and Decision; Date and Location: Nov. 12-16, 2018, Spokane, USA, consisting of 5-pages.
3GPP TS 38.133 V15.3.0; 3rd Generation Partnership Project; Technical Specification Group Radio Access Network; NR; Requirements for support of radio resource management (Release 15), Sep. 2018, consisting of 136-pages.
Japanese Office Action and English Summary dated Nov. 18, 2022 for Application No. 2021-559028, consisting of 12 pages.
3GPP TSG-RAN WG2 #99 Tdoc R2-1708189; Title: DRX with short on-duration and Wake-up signaling; Agenda Item: 10.3.1.10; Source: Ericsson; Document for: Discussion, Decision; Location and Date: Berlin, Germany, Aug. 21-25, 2017, consisting of 3 pages.
3GPP TSG RAN WG2 NR #99 R2-1709115; Title: Wake-Up Signaling for C-DRX; Agenda item: 10.3.1.10; Source: Qualcomm Incorporated; Document for: Discussion/Decision; Location and Date: Berlin, Germany, Aug. 21-25, 2017, consisting of 5 pages.
3GPP RAN WG1 Meeting #96 R1-1902850; Title: UE power saving schemes; Agenda item: 7.2.9.2; Source: Motorola Mobility, Lenovo; Document for: Discussion; Location and Date: Athens, Greece, Feb. 25-Mar. 1, 2019, consisting of 3 pages.
3GPP TS 38.212 V15.4.0; 3rd Generation Partnership Project; Technical Specification Group Radio Access Network NR; Multiplexing and channel coding (Release 15); Dec. 2018, consisting of 100 pages.
3GPP TS 38.331 V15.4.0; 3rd Generation Partnership Project; Technical Specification Group Radio Access Network; NR; Radio Resource Control (RRC) protocol specification (Release 15); Dec. 2018, consisting of 474 pages.
3GPP TSG RAN WG1 Meeting #96bis R1-1904229; Title: UE-group wake-up signal for NB-IoT; Agenda Item: 6.2.2.1; Source: Sony; Document for: Discussion and Decision; Location and Date: Xi'an, China, Apr. 8-12, 2019, consisting of 5 pages.
3GPP TSG-RAN WG1 Meeting #96 R1-1903016; Title: Potential Techniques for UE Power Saving; Agenda Item 7.2.9.2; Source: Qualcomm Incorporated; Document for: Discussion/Decision; Location and Date: Athens, Greece, Feb. 25-Mar. 1, 2019, consisting of 33 pages.
3GPP TSG-RAN WG2 Meeting #105bis R2-1903047; Title: Wakeup signaling and its RAN2 impact; Agenda item: 11.11.4.1; Source: Qualcomm Inc; WID/SID: FS_NR_UE_pow_sav; Document for: Discussion and Decision; Location and Date: Xi'an, China, Apr. 8-12, 2019, consisting of 8 pages.
Indian Office Action dated May 12, 2022 for Patent Application No. 202147049543, consisting of 6-pages.
European Communication Intent to grant dated Nov. 3, 2022 for Application No. 20 720 543.6, consisting of 9 pages.

* cited by examiner

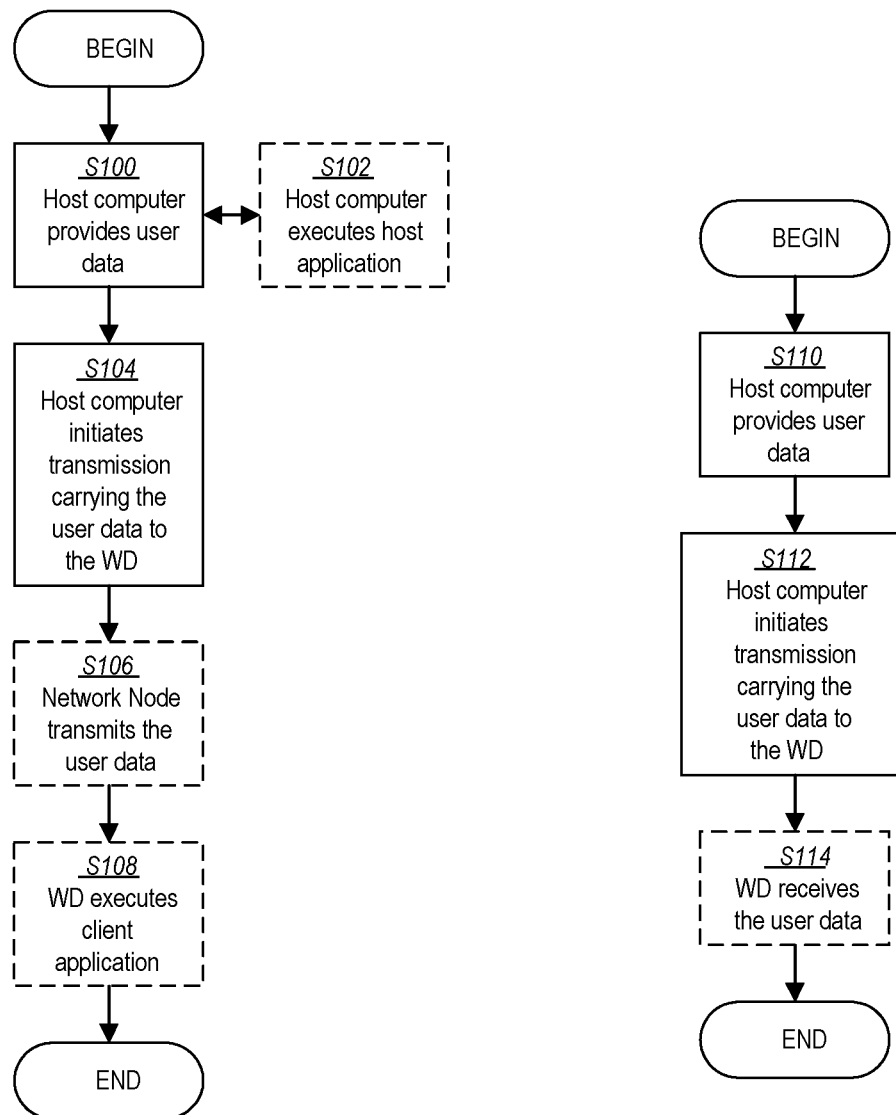

METHODS FOR PHYSICAL DOWNLINK CONTROL CHANNEL (PDCCH) BASED WAKE UP SIGNAL (WUS) CONFIGURATION

CROSS-REFERENCE TO RELATED APPLICATIONS

This application is a Submission Under 35 U.S.C. § 371 for U.S. National Stage Patent Application of International Application No.: PCT/SE2020/050349, filed Apr. 2, 2020 entitled "METHODS FOR PHYSICAL DOWNLINK CONTROL CHANNEL (PDCCH) BASED WAKE UP SIGNAL (WUS) CONFIGURATION," which claims priority to U.S. Provisional Application No. 62/828,126, filed Apr. 2, 2019, entitled "METHODS FOR PDCCH BASED WUS CONFIGURATION," the entireties of both of which are incorporated herein by reference.

TECHNICAL FIELD

The present disclosure relates to wireless communications, and in particular, to a network identifier for indicating a downlink control channel-based wake-up signal for at least one wireless device before at least one ON duration of the at least one wireless device.

BACKGROUND

The New Radio (NR, also referred to as 5th Generation (5G)) standard in the Third Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB may be a high data rate with moderate latency and moderate coverage, while URLLC service may require a low latency and high reliability transmission but perhaps for moderate data rates.

One of the solutions for low latency data transmission is shorter transmission time intervals. In NR, in addition to transmission in a slot, a mini-slot transmission is also permitted, and which reduces latency. A radio resource in NR is illustrated in FIG. 1. A mini-slot may consist of any number of 1 to 14 OFDM symbols. The concepts of slot and mini-slot are not specific to a specific service, meaning that a mini-slot may be used for either eMBB, URLLC, or other services.

Further, wireless device power consumption is a metric that needs to be enhanced. In general, significant power can be spent on monitoring the Physical Downlink Control Channel (PDCCH) in Long Term Evolution (LTE) based on one Discontinuous Reception (DRX) setting from LTE field logs. The situation can be similar in NR if similar DRX setting with traffic modelling is utilized, as the wireless device may need to perform blind detection in its configured control resource sets (CORESETs) to identify whether there is a PDCCH sent to it, and act accordingly. Techniques that can reduce unnecessary PDCCH monitoring or that allows the wireless device to go to sleep or wake-up only when required can be beneficial, thereby providing power savings when in DRX.

Further, in the Third Generation Partnership Project (3GPP) Random Access Network (RAN) 1 wireless device Power Saving Study Item, Physical Downlink Control Channel (PDCCH) based power saving signal is a technique to improve wireless device power consumption as compared with other techniques. The PDCCH based power saving signal is associated with the conventional Connected Mode Discontinuous Reception (C-DRX). PDDCH based Wake-up-signaling (WUS) is considered as an efficient realization this technique.

WUS may include sending a power saving signal before the ON duration of C-DRX in case the network node wants to wake-up the wireless device for that ON duration, and upon detection of the WUS, the wireless device wakes-up and, e.g., monitors PDCCH in the next ON duration.

While the high level concept is known, the specification and/or specific details of PDCCH-based WUS is not known and remains to be defined.

SUMMARY

Some embodiments advantageously provide methods, systems, and apparatuses for a network identifier for indicating a downlink control channel based wake-up signal for at least one wireless device before at least one ON duration of the at least one wireless device.

The instant disclosure describes one or more aspects related to configuration of PDCCH based WUS.

In one or more embodiments, a (or a set of) new group based RNTI (called GW-RNTI) is used for PDCCH based WUS operation and further mechanisms are described to group various wireless devices together and assign them to various (one or several) GW-RNTIs to address a specific wireless device, a group of wireless devices or all the wireless devices within the cell.

In one or more embodiments, at least one method is provided to determine the WUS occasion offset with the ON duration and the possibility of using a new DCI format as WUS as well as issues related to CORESET/SS configuration, UE behavior with and without detection of PDCCH based WUS associated with GW-RNTI, and issues related to the false detection of WUS associated with the GW-RNTI.

According to one aspect of the disclosure, a network node is provided. The network node is configured to configure each wireless device in a first group of wireless devices including at least one wireless device with a first radio network temporary identifier, RNTI, defined to address a group of wireless devices for physical downlink control channel, PDCCH, based wake-up signal, WUS, operation. The network node is further configured to cause transmission of signaling including a wake-up signal, WUS, for a first WUS monitoring occasion associated with the first group of wireless devices where the WUS is configured to cause each wireless device in the first group of wireless devices to perform at least one action.

According to one or more embodiments of this aspect, the network node is further configured to use the first RNTI defined to address a group of wireless devices to scramble a Cyclic Redundancy Check, CRC, in the signaling. According to one or more embodiments of this aspect, the first RNTI defined to address a group of wireless devices is configured via radio resource control, RRC, signaling. According to one or more embodiments of this aspect, the network node is further configured to configure one or more of the wireless devices in the first group of wireless devices with a second RNTI defined to address a group of wireless devices that is associated with another group of wireless devices.

According to one or more embodiments of this aspect, the first RNTI defined to address a group of wireless devices is associated with a downlink control information, DCI, format that is different from DCI formats 0-0, 0-1, 1-1 and 1-1.

According to one or more embodiments of this aspect, the network node is further configured to configure the first WUS monitoring occasion for the first group of wireless devices with at least a time offset relative to a first discontinuous reception, DRX, ON duration period. According to one or more embodiments of this aspect, the network node is further configured to configure downlink control information, DCI, addressed to the first group of wireless devices where the DCI includes a bitmap where a first plurality of bits are configured to indicate whether to wake-up a first subgroup of the first group of wireless devices and a second plurality of bits are configured to indicate whether to wake-up a second subgroup of the first group of wireless devices.

According to one or more embodiments of this aspect, the first subgroup of the first group of wireless devices is associated with a first DRX ON duration period, where the second subgroup of the first group of wireless devices is associated with a second DRX ON duration period. According to one or more embodiments of this aspect, the network node is further configured to configure downlink control information, DCI, addressed to the first group of wireless devices, the DCI comprising a bitmap including: a first plurality of bits indicating which one or more of a plurality of subgroups of the first group of wireless devices that is selected to implement the WUS, and a second plurality of bits indicating information for implementing the WUS. According to one or more embodiments of this aspect, the network node is further configured to configure the first group of wireless devices with a first control resource set, CORESET, and first common search space, CSS, configuration for searching for the WUS, the first CORESET and first CSS configuration being associated with the first group of wireless devices.

According to one or more embodiments of this aspect, the at least one action includes monitoring a physical downlink control channel during a first DRX ON duration period. According to one or more embodiments of this aspect, the at least one action includes at least one of triggering of an aperiodic channel state information, CSI, report and scheduling of a physical downlink shared channel, PDSCH.

According to another aspect of the disclosure, a method implemented by a network node is provided. Each wireless device in a first group of wireless devices including at least one wireless device is configured with a first radio network temporary identifier, RNTI, defined to address a group of wireless devices for physical downlink control channel, PDCCH, based wake-up signal, WUS, operation. Transmission of signaling including a wake-up signal, WUS, for a first WUS monitoring occasion associated with the first group of wireless devices is caused where the WUS is configured to cause each wireless device in the first group of wireless devices to perform at least one action.

According to one or more embodiments of this aspect, the first RNTI defined to address a group of wireless devices is used to scramble a Cyclic Redundancy Check, CRC, in the signaling. According to one or more embodiments of this aspect, the first RNTI defined to address a group of wireless devices is configured via radio resource control, RRC, signaling. According to one or more embodiments of this aspect, one or more of the wireless devices in the first group of wireless devices are configured with a second RNTI defined to address a group of wireless devices that is associated with another group of wireless devices.

According to one or more embodiments of this aspect, the first RNTI defined to address a group of wireless devices is associated with a downlink control information, DCI, format that is different from DCI formats 0-0, 0-1, 1-1 and 1-1.

According to one or more embodiments of this aspect, the first WUS monitoring occasion for the first group of wireless devices is configured with at least a time offset relative to a first discontinuous reception, DRX, ON duration period. According to one or more embodiments of this aspect, configuring downlink control information, DCI, addressed to the first group of wireless devices is configured where the DCI includes a bitmap where a first plurality of bits are configured to indicate whether to wake-up a first subgroup of the first group of wireless devices and a second plurality of bits are configured to indicate whether to wake-up a second subgroup of the first group of wireless devices.

According to one or more embodiments of this aspect, the first subgroup of the first group of wireless devices is associated with a first DRX ON duration period, where the second subgroup of the first group of wireless devices is associated with a second DRX ON duration period. According to one or more embodiments of this aspect, configuring downlink control information, DCI, addressed to the first group of wireless devices is configured where the DCI includes a bitmap including: a first plurality of bits indicating which one or more of a plurality of subgroups of the first group of wireless devices that is selected to implement the WUS, and a second plurality of bits indicating information for implementing the WUS. According to one or more embodiments of this aspect, the first group of wireless devices is configured with a first control resource set, CORESET, and first common search space, CSS, configuration for searching for the WUS where the first CORESET and first CSS configuration are associated with the first group of wireless devices.

According to one or more embodiments of this aspect, the at least one action includes monitoring a physical downlink control channel during a first DRX ON duration period. According to one or more embodiments of this aspect, the at least one action includes at least one of triggering of an aperiodic channel state information, CSI, report and scheduling of a physical downlink shared channel, PDSCH.

According to another aspect of the disclosure, a wireless device configured to communicate with a network node is provided. The wireless device is configured to obtain a configuration comprising a first radio network temporary identifier, RNTI, defined to address a group of wireless devices for physical downlink control channel, PDCCH, based wake-up signal, WUS, operation, receive signaling including a wake-up signal, WUS, in a first WUS monitoring occasion associated with a first group of wireless devices that includes at least the wireless device where the WUS is configured to cause the first group of wireless devices to perform at least one action, and perform the at least one action.

According to one or more embodiments of this aspect, the wireless device is further configured to descramble a cyclic redundancy check, CRC, in the signaling using the first RNTI defined to address a group of wireless devices. According to one or more embodiments of this aspect, the first RNTI is defined to address a group of wireless devices is configured via radio resource control, RRC, signaling. According to one or more embodiments of this aspect, the wireless device is further configured with a second RNTI defined to address a group of wireless devices that is associated with another group of wireless devices.

According to one or more embodiments of this aspect, the first RNTI is defined to address a group of wireless devices is associated with a downlink control information, DCI, format that is different from DCI formats 0-0, 0-1, 1-1 and 1-1. According to one or more embodiments of this aspect, the first WUS monitoring occasion associated with the first group of wireless devices is offset by at least a time offset relative to a first discontinuous reception, DRX, ON duration period. According to one or more embodiments of this aspect, the signaling includes downlink control information, DCI, addressed to the first group of wireless devices where the DCI includes a bitmap where a first plurality of bits are configured to indicate whether to wake-up a first subgroup of the first group of wireless devices and a second plurality of bits are configured to indicate whether to wake-up a second subgroup of the first group of wireless devices.

According to one or more embodiments of this aspect, the first subgroup of the first group of wireless devices is associated with a first DRX ON duration period, where the second subgroup of the first group of wireless devices is associated with a second DRX ON duration period. According to one or more embodiments of this aspect, the signaling includes downlink control information, DCI, addressed to the first group of wireless devices where the DCI includes a bitmap including: a first plurality of bits indicating which one or more of a plurality of subgroups of the first group of wireless devices that is selected to implement the WUS, and a second plurality of bits indicating information for implementing the WUS. According to one or more embodiments of this aspect, the wireless device is further configured to use a first control resource set, CORESET, and first common search space, CSS, configuration to search for the WUS, the first CORESET and first CSS configuration being associated with the first group of wireless devices.

According to one or more embodiments of this aspect, the at least one action includes monitoring a physical downlink control channel during a first DRX ON duration period. According to one or more embodiments of this aspect, the at least one action includes at least one of triggering of an aperiodic channel state information, CSI, report and scheduling of a physical downlink shared channel, PDSCH.

According to another aspect of the disclosure, a method implemented by a wireless device that is configured to communicate with a network node is provided. A configuration including a first radio network temporary identifier, RNTI, defined to address a group of wireless devices for physical downlink control channel, PDCCH, based wake-up signal, WUS, operation is obtained. Signaling including a wake-up signal, WUS, in a first WUS monitoring occasion associated with a first group of wireless devices that includes at least the wireless device is received where the WUS is configured to cause the first group of wireless devices to perform at least one action. The at least one action is performed.

According to one or more embodiments of this aspect, a cyclic redundancy check, CRC, in the signaling is descrambled using the first RNTI defined to address a group of wireless devices. According to one or more embodiments of this aspect, the first RNTI defined to address a group of wireless devices is configured via radio resource control, RRC, signaling. According to one or more embodiments of this aspect, the wireless device is configured with a second RNTI that is defined to address a group of wireless devices that is associated with another group of wireless devices.

According to one or more embodiments of this aspect, the first RNTI defined to address a group of wireless devices is associated with a downlink control information, DCI, format that is different from DCI formats 0-0, 0-1, 1-1 and 1-1. According to one or more embodiments of this aspect, the first WUS monitoring occasion associated with the first group of wireless devices is offset by at least a time offset relative to a first discontinuous reception, DRX, ON duration period. According to one or more embodiments of this aspect, the signaling includes downlink control information, DCI, addressed to the first group of wireless devices where the DCI includes a bitmap where a first plurality of bits are configured to indicate whether to wake-up a first subgroup of the first group of wireless devices and a second plurality of bits are configured to indicate whether to wake-up a second subgroup of the first group of wireless devices.

According to one or more embodiments of this aspect, the first subgroup of the first group of wireless devices is associated with a first DRX ON duration period, and where the second subgroup of the first group of wireless devices is associated with a second DRX ON duration period. According to one or more embodiments of this aspect, the signaling includes downlink control information, DCI, addressed to the first group of wireless devices where the DCI includes a bitmap including: a first plurality of bits indicating which one or more of a plurality of subgroups of the first group of wireless devices that is selected to implement the WUS, and a second plurality of bits indicating information for implementing the WUS. According to one or more embodiments of this aspect, a first control resource set, CORESET, and first common search space, CSS, configuration is used to search for the WUS, the first CORESET and first CSS configuration being associated with the first group of wireless devices.

According to one or more embodiments of this aspect, the at least one action includes monitoring a physical downlink control channel during a first DRX ON duration period. According to one or more embodiments of this aspect, the at least one action includes at least one of triggering of an aperiodic channel state information, CSI, report and scheduling of a physical downlink shared channel, PDSCH.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
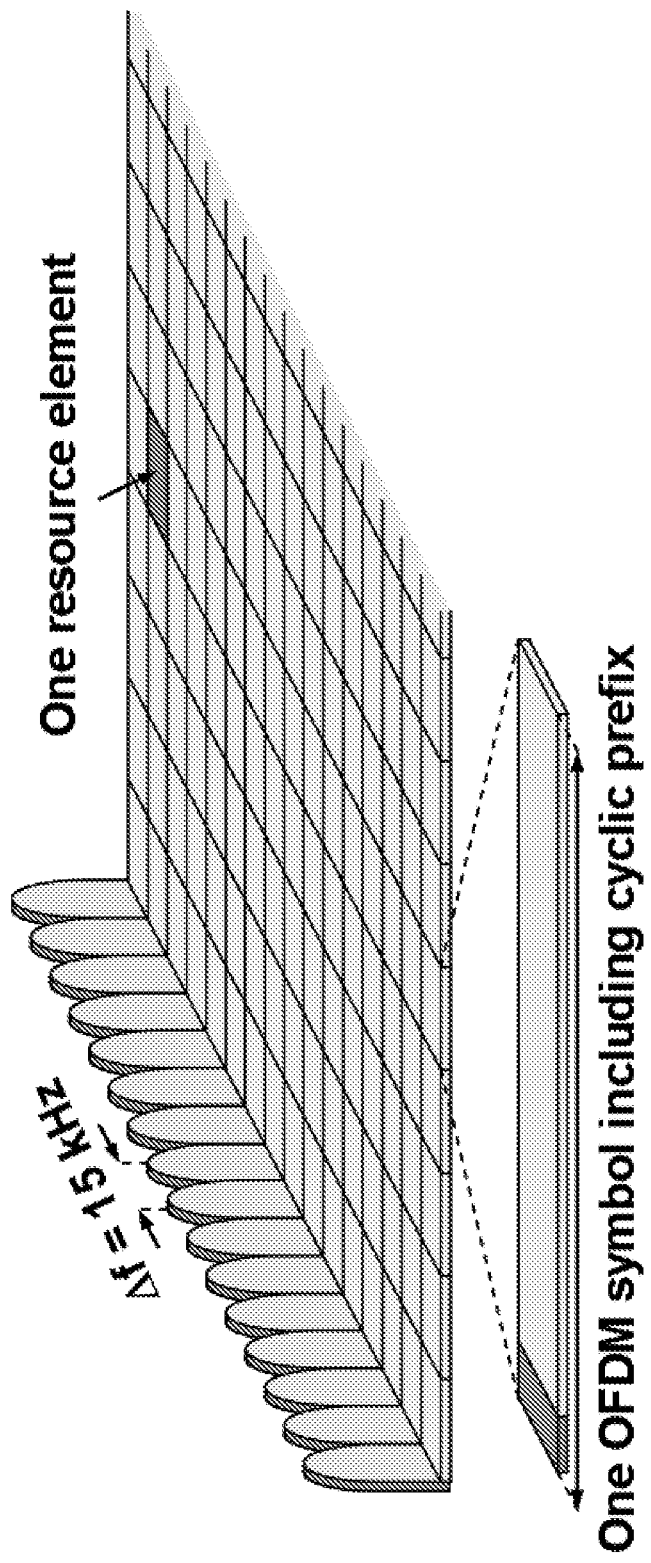
FIG. 1 is a block diagram of a radio resource in new radio (NR)

As discussed above, WUS is used as a mechanism for informing the wireless device as to whether there is a potential message for the wireless device during the upcoming connected DRX on period. When the wireless device does not detect WUS prior to the start of the DRX On period (OnDuration), the wireless device is not required to monitor the PDCCH during the following OnDuration. Otherwise the wireless device may be required to monitor the PDCCHs during the following OnDuration if a WUS is detected. However, details such as how to divide the wireless devices into various groups and how to address them before the OnDurations remain to be specified. Some embodiments addressing this problem are described herein.

PDCCH encoding and Cyclic Redundancy Check (CRC) scrambling with RNTI can be used for a wireless device to identify the PDCCH based WUS. One approach is to use the existing RNTIs. While existing RNTIs, particularly C-RNTI can be a basis for WUS RNTI for wireless device specific applications, in some cases, the network node may want to address multiple wireless devices at the same time, e.g., if various wireless device may need to wake up in a given ON duration. If the network node sends a WUS individually to each wireless device, this may lead to a large network node overhead, i.e., signaling overhead or adding signaling in the network. As such, there may be a need for RNTI to be flexible such that the network node is able to address a group of wireless devices using a same transmitted RNTI.

In addition to RNTI, other specific aspects of the PDCCH based WUS are not yet defined in the standard specification such as CORESET/SS, WUS occasion Offsets, wireless device behavior upon detection or not detection of WUS, as well as false detection and so on.

Therefore, there may be a need for developing methods and mechanisms for PDCCH based configuration for NR wireless devices.

The instant disclosure advantageously solves at least a portion of the problems of existing systems by at least facilitating PDCCH based WUS configuration from different aspects which in turn leads to wireless device power savings with limited impact on network performance. Particularly, for the network node, the ability to address a group of wireless devices using GW-RNTI may be beneficial as this may lead to saving network control channel resources.

Before describing in detail exemplary embodiments, it is noted that the embodiments reside primarily in combinations of apparatus components and processing steps related to a network identifier for indicating a downlink control channel based wake-up signal for at least one wireless device before at least one ON duration of the at least one wireless device. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or at least one DRX related feature and/or monitoring feature. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Data/information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a network identifier for indicating a downlink control channel based wake-up signal for at least one wireless device before at least one ON duration of the at least one wireless device.

Figure 2:
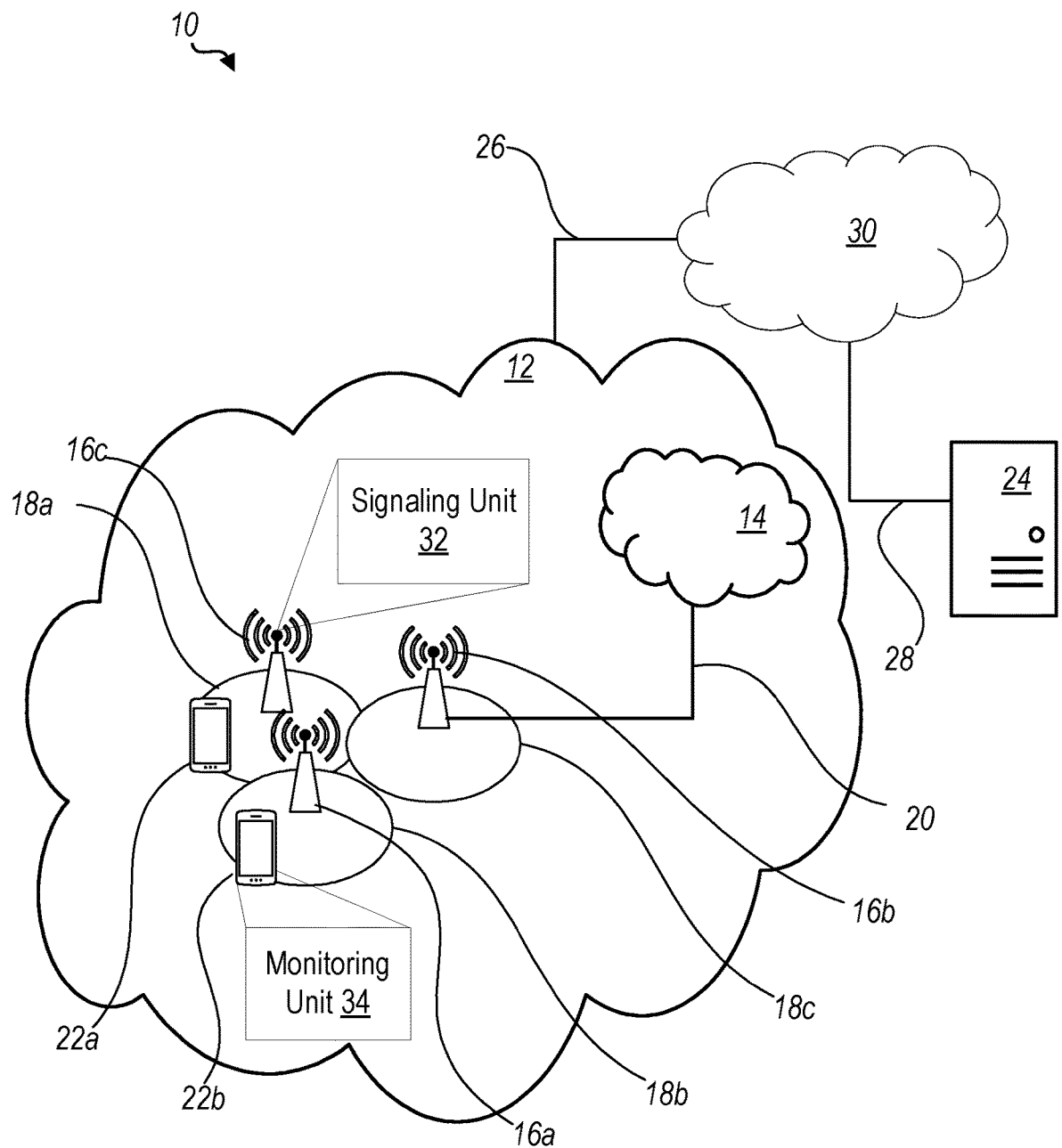
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an signaling unit 32. A wireless device 22 is configured to include a monitoring unit 34.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, determine, communicate, transmit, receive, forward, relay, store, etc., information related to a network identifier for indicating a downlink control channel based wake-up signal for at least one wireless device before at least one ON duration of the at least one wireless device.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include signaling unit 32 configured perform one or more network node 16 functions described herein such as with respect to a network identifier for indicating a downlink control channel based wake-up signal for at least one wireless device before at least one ON duration of the at least one wireless device.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a monitoring unit 34 configured to perform one or more wireless device functions described herein such as with respect to a network identifier for indicating a downlink control channel based wake-up signal for at least one wireless device before at least one ON duration of the at least one wireless device In some embodiments, the inner workings of the network node 16, WD 22, and host computer 24 may be as shown in FIG. 3 and independently, the surrounding network topology may be that of FIG. 2.

Figure 3:
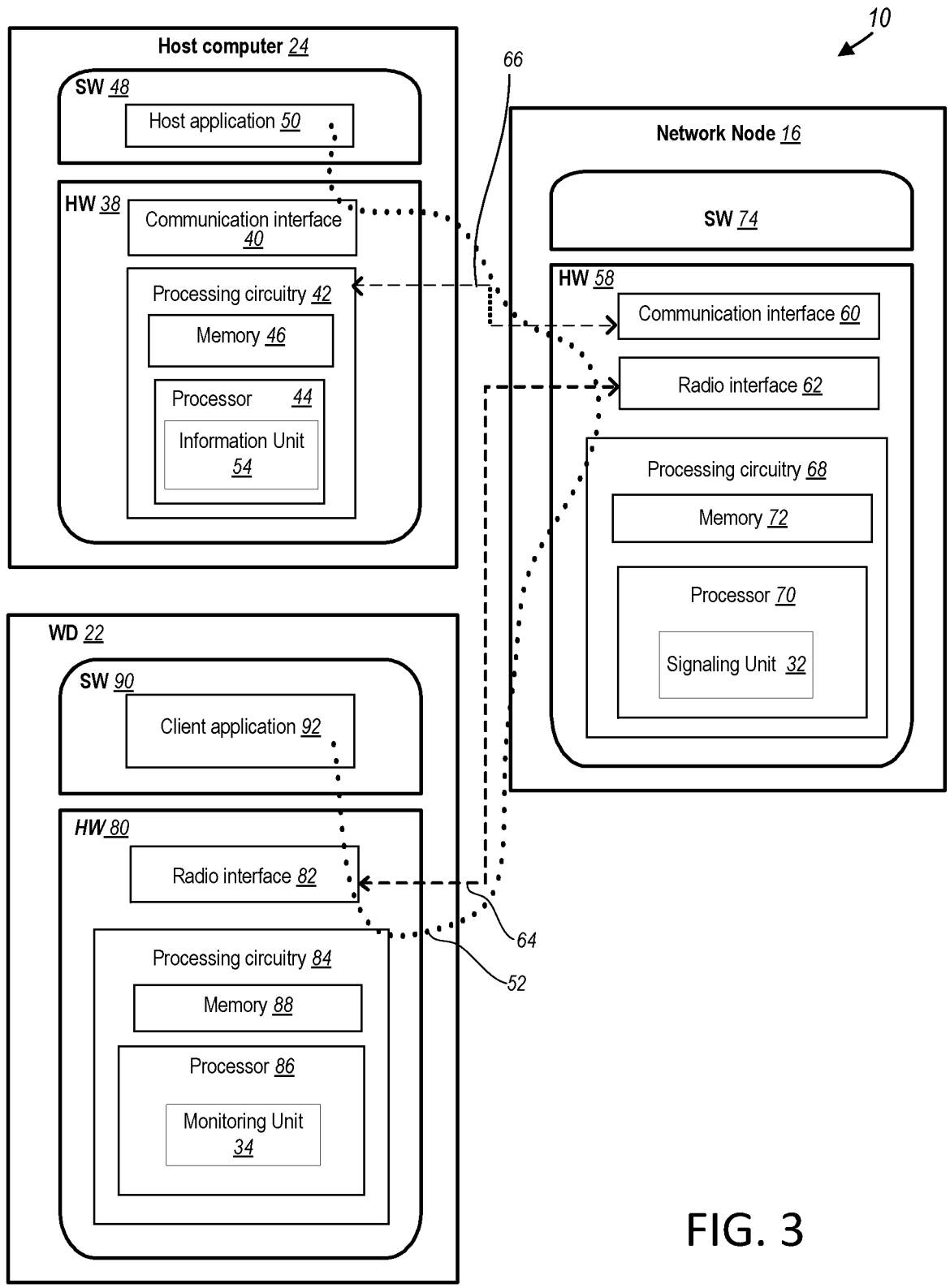
FIG. 3 is a block diagram of a host computer communicating via a network node with a wireless device over an at least partially wireless connection according to some embodiments of the present disclosure.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as signaling unit 32, and monitoring unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
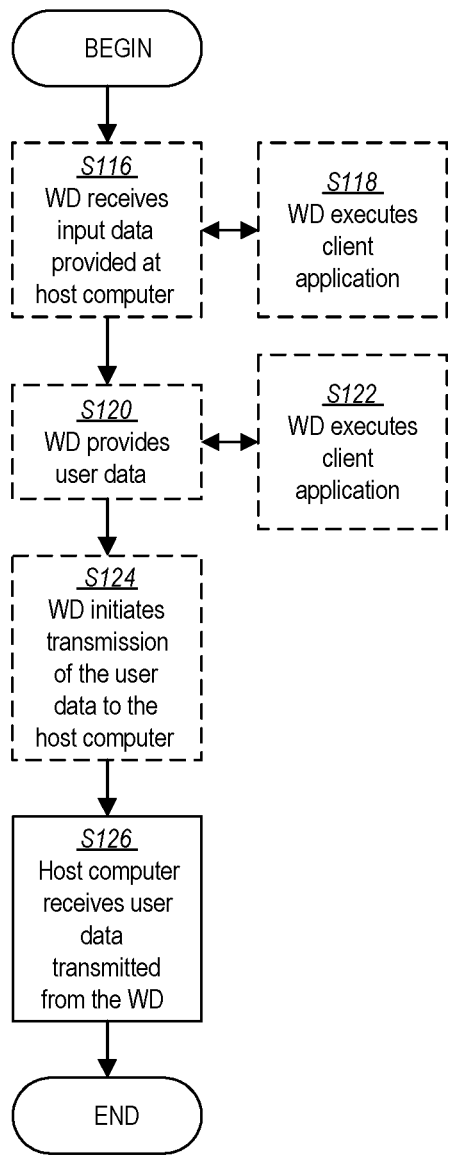
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
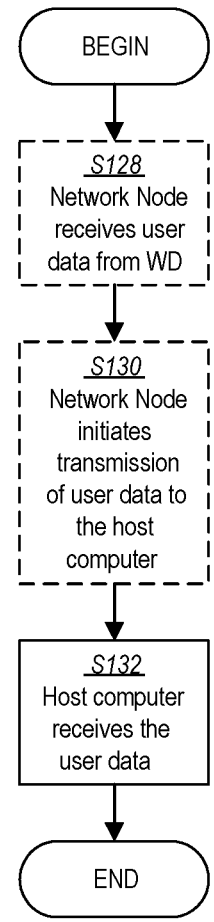
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
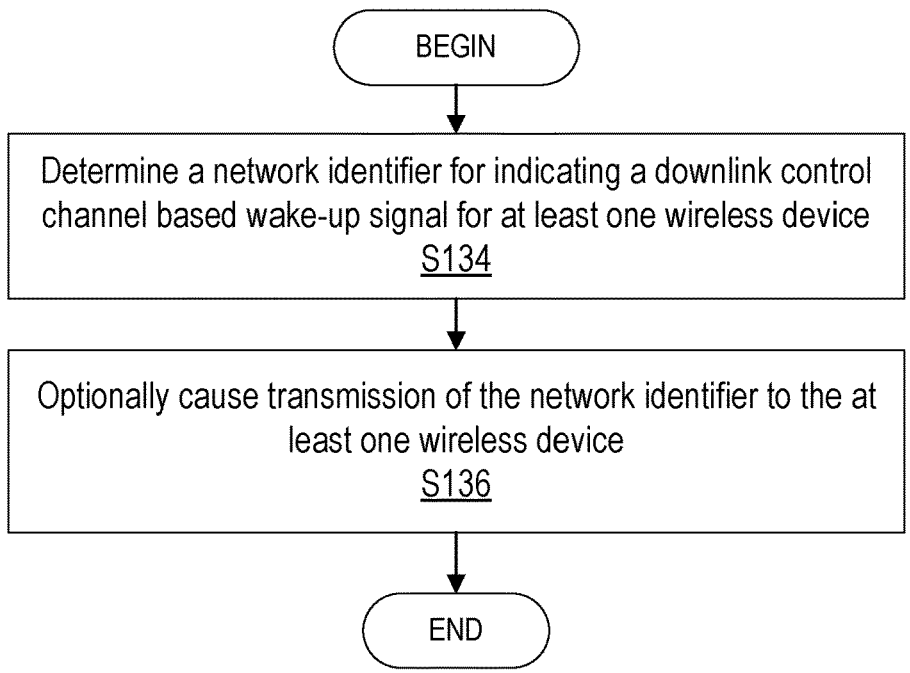
FIG. 8 is a flowchart of an exemplary process in a network node according to some embodiments of the present disclosure.

FIG. 8 is a flowchart of an exemplary process in a network node 16 according to one or more embodiments of the disclosure. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, communication interface 60 and radio interface 62 is configured to determine (Block S134) a network identifier for indicating a downlink control channel based wake-up signal for at least one wireless device 22. In one or more embodiments, network node 16 such as via one or more of processing circuitry 68, processor 70, communication interface 60 and radio interface 62 is configured to optionally cause (Block S136) transmission of the network identifier to the at least one wireless device.

In one or more embodiments, the downlink control channel based wake-up signal is configured to be implemented before an ON duration of a discontinuous reception cycle of the at least one wireless device 22. In one or more embodiments, the wake-up signal is based at least in part on a downlink control information (DCI) format that indicates a group of wireless devices 22, and the network identifier being a Radio Network Temporary Identifier (RNTI).

Figure 9:
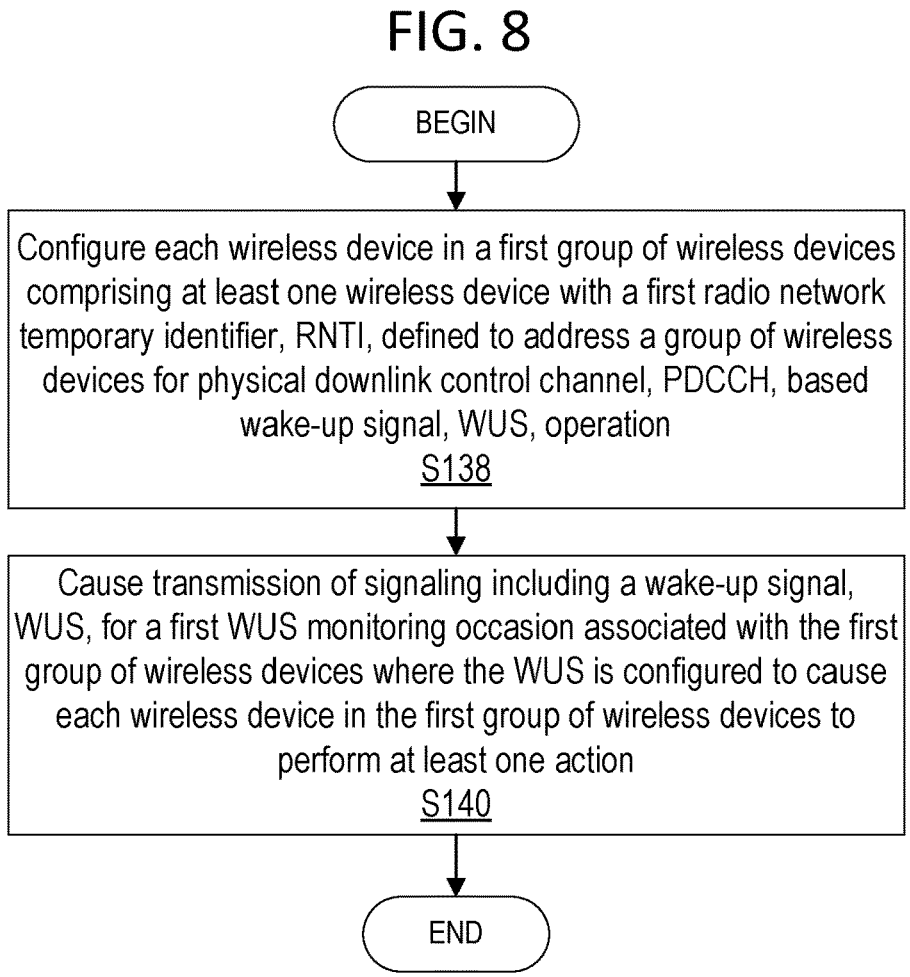
FIG. 9 is a flowchart of another exemplary process in a network node according to some embodiments of the present disclosure.

FIG. 9 is a flowchart of another exemplary process in a network node 16 according to one or more embodiments of the disclosure. One or more Blocks and/or functions performed by network node 16 may be performed by one or more elements of network node 16 such as by signaling unit 32 in processing circuitry 68, processor 70, radio interface 62, etc. In one or more embodiments, network node 16 such as via one or more of processing circuitry 68, processor 70, communication interface 60 and radio interface 62 is configured to configure (Block S138) each wireless device 22 in a first group of wireless devices 22 including at least one wireless device 22 with a first radio network temporary identifier, RNTI, defined to address a group of wireless devices for physical downlink control channel, PDCCH, based wake-up signal, WUS, operation, as described herein. In one or more embodiments, network node 16 such as via one or more of processing circuitry 68, processor 70, communication interface 60 and radio interface 62 is configured to cause (Block S140) transmission of signaling including a wake-up signal, WUS, for a first WUS monitoring occasion associated with the first group of wireless devices 22 where the WUS is configured to cause each wireless device 22 in the first group of wireless devices to perform at least one action, as described herein.

According to one or more embodiments, the network node 16 such as via one or more of processing circuitry 68, processor 70, communication interface 60 and radio interface 62 is further configured to use the first RNTI defined to address a group of wireless devices to scramble a Cyclic Redundancy Check, CRC, in the signaling. According to one or more embodiments, the first RNTI defined to address a group of wireless devices is configured via radio resource control, RRC, signaling. According to one or more embodiments, the network node 16 such as via one or more of processing circuitry 68, processor 70, communication interface 60 and radio interface 62 is further configured to configure one or more of the wireless devices 22 in the first group of wireless devices with a second RNTI defined to address a group of wireless devices for physical downlink control channel, PDCCH, based wake-up signal, WUS, operation. The second RNTI defined to address a group of wireless devices is associated with another group of wireless devices 22.

According to one or more embodiments, the first RNTI defined to address a group of wireless devices is associated with a downlink control information, DCI, format that is different from DCI formats 0-0, 0-1, 1-1 and 1-1. According to one or more embodiments, the network node 16 is further configured to configure the first WUS monitoring occasion for the first group of wireless devices 22 with at least a time offset relative to a first discontinuous reception, DRX, ON duration period. According to one or more embodiments, the network node 16 is further configured to configure downlink control information, DCI, addressed to the first group of wireless devices 22 where the DCI includes a bitmap where a first plurality of bits are configured to indicate whether to wake-up a first subgroup of the first group of wireless devices 22 and a second plurality of bits are configured to indicate whether to wake-up a second subgroup of the first group of wireless devices 22.

According to one or more embodiments, the first subgroup of the first group of wireless devices 22 is associated with a first DRX ON duration period, where the second subgroup of the first group of wireless devices 22 is associated with a second DRX ON duration period. According to one or more embodiments, the network node 16 such as via one or more of processing circuitry 68, processor 70, communication interface 60 and radio interface 62 is further configured to configure downlink control information, DCI, addressed to the first group of wireless devices 22, the DCI comprising a bitmap including: a first plurality of bits indicating which one or more of a plurality of subgroups of the first group of wireless devices 22 that is selected to implement the WUS, and a second plurality of bits indicating information for implementing the WUS. According to one or more embodiments, the network node 16 such as via one or more of processing circuitry 68, processor 70, communication interface 60 and radio interface 62 is further configured to configure the first group of wireless devices with a first control resource set, CORESET, and first common search space, CSS, configuration for searching for the WUS, the first CORESET and first CSS configuration being associated with the first group of wireless devices 22. According to one or more embodiments, the at least one action includes monitoring a physical downlink control channel during a first DRX ON duration period. According to one or more embodiments, the at least one action includes at least one of triggering of an aperiodic channel state information, CSI, report and scheduling of a physical downlink shared channel, PDSCH.

Figure 10:
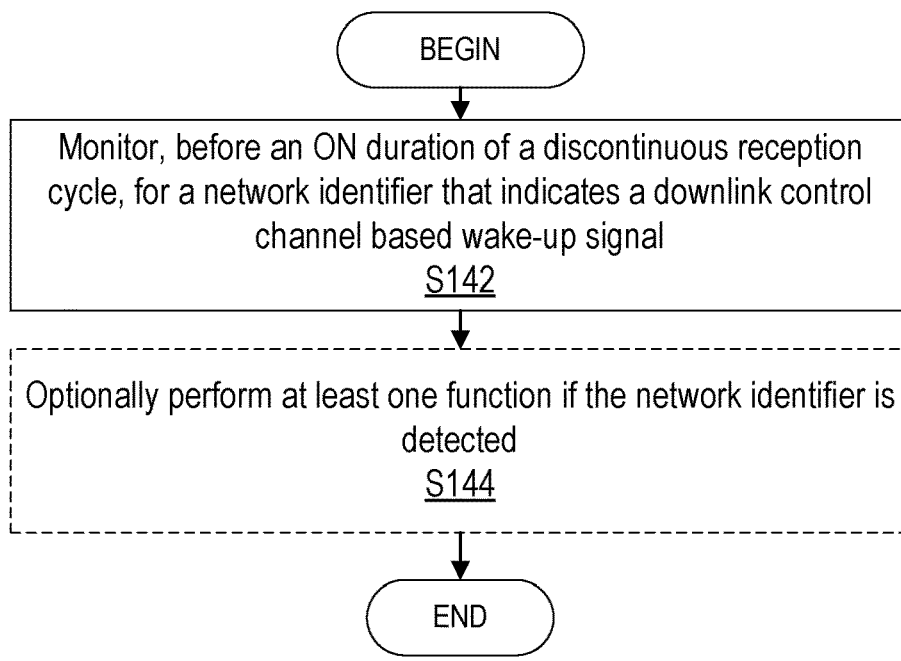
FIG. 10 is a flowchart of an exemplary process in a wireless device according to some embodiments of the present disclosure.

FIG. 10 is a flowchart of an exemplary process in a wireless device 22 according to one or more embodiments. One or more Blocks and/or functions performed by wireless device 22 may be performed by one or more elements of wireless device 22 such as by monitoring unit 34 in processing circuitry 84, processor 86, radio interface 82, etc. In one or more embodiments, wireless device such as via one or more of processing circuitry 84, processor 86 and radio interface 82 is configured to monitor (Block S142), before an ON duration of a discontinuous reception cycle, for a network identifier that indicates a downlink control channel based wake-up signal. In one or more embodiments, wireless device such as via one or more of processing circuitry 84, processor 86 and radio interface 82 is configured to optionally perform (Block S144) at least in function if the network identifier is detected.

In one or more embodiments, the wake-up signal is based at least in part on a downlink control information (DCI) format that indicates a group of wireless devices 22. In one or more embodiments, the network identifier is a Radio Network Temporary Identifier (RNTI) that is associated with a plurality of wireless devices 22.

Figure 11:
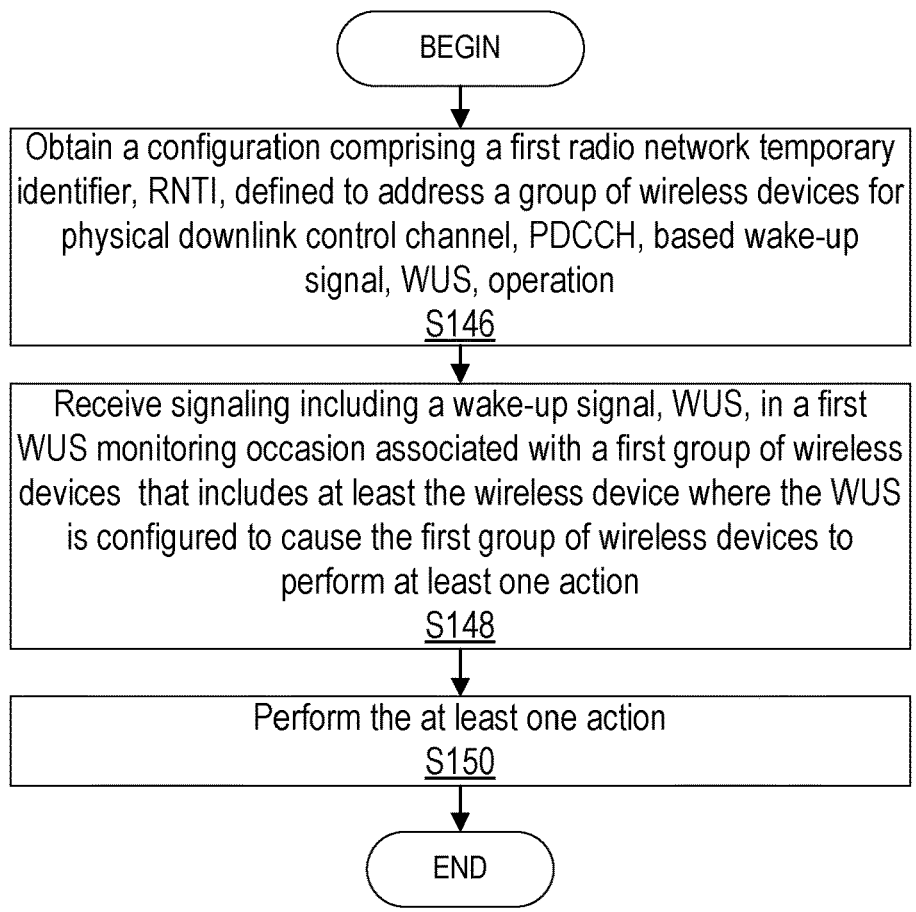
FIG. 11 is a flowchart of another exemplary process in a wireless device according to some embodiments of the present disclosure.

FIG. 11 is a flowchart of an exemplary process in a wireless device 22 according to one or more embodiments. One or more Blocks and/or functions performed by wireless device 22 may be performed by one or more elements of wireless device 22 such as by monitoring unit 34 in processing circuitry 84, processor 86, radio interface 82, etc. In one or more embodiments, wireless device 22 such as via one or more of processing circuitry 84, processor 86 and radio interface 82 is configured to obtain (Block S146), from a network node 16, a configuration including a first radio network temporary identifier, RNTI, defined to address a group of wireless devices 22 for physical downlink control channel, PDCCH, based wake-up signal, WUS, operation, as described herein.

In one or more embodiments, wireless device 22 such as via one or more of processing circuitry 84, processor 86 and radio interface 82 is configured to receive (Block S148), from a network node (16), signaling including a wake-up signal, WUS, in a first WUS monitoring occasion associated with a first group of wireless devices (22) that includes at least the wireless device 22 where the WUS is configured to cause the first group of wireless devices (22) to perform at least one action, as described herein. In one or more embodiments, wireless device 22 such as via one or more of processing circuitry 84, processor 86 and radio interface 82 is configured to perform (Block S150) the at least one action, as described herein.

According to one or more embodiments, the wireless device 22 such as via one or more of processing circuitry 84, processor 86 and radio interface 82 is further configured to descramble a cyclic redundancy check, CRC, in the signaling using the first RNTI defined to address a group of wireless devices. According to one or more embodiments, the first RNTI is defined to address a group of wireless devices is configured via radio resource control, RRC, signaling. According to one or more embodiments, the wireless device 22 is further configured with a second RNTI defined to address a group of wireless devices for physical downlink control channel, PDCCH, based wake-up signal, WUS, operation. The second RNTI defined to address a group of wireless devices is associated with another group of wireless devices 22.

According to one or more embodiments, the first RNTI is defined to address a group of wireless devices is associated with a downlink control information, DCI, format that is different from DCI formats 0-0, 0-1, 1-1 and 1-1. According to one or more embodiments, the first WUS monitoring occasion associated with the first group of wireless devices 22 is offset by at least a time offset relative to a first discontinuous reception, DRX, ON duration period. According to one or more embodiments, the signaling includes downlink control information, DCI, addressed to the first group of wireless devices 22 where the DCI includes a bitmap where a first plurality of bits are configured to indicate whether to wake-up a first subgroup of the first group of wireless devices 22 and a second plurality of bits are configured to indicate whether to wake-up a second subgroup of the first group of wireless devices 22.

According to one or more embodiments, the first subgroup of the first group of wireless devices 22 is associated with a first DRX ON duration period, where the second subgroup of the first group of wireless devices 22 is associated with a second DRX ON duration period. According to one or more embodiments, the signaling includes downlink control information, DCI, addressed to the first group of wireless devices 22 where the DCI includes a bitmap including: a first plurality of bits indicating which one or more of a plurality of subgroups of the first group of wireless devices 22 that is selected to implement the WUS, and a second plurality of bits indicating information for implementing the WUS. According to one or more embodiments, the wireless device 22 is further configured to use a first control resource set, CORESET, and first common search space, CSS, configuration to search for the WUS, the first CORESET and first CSS configuration being associated with the first group of wireless devices 22.

According to one or more embodiments, the at least one action includes monitoring a physical downlink control channel during a first DRX ON duration period. According to one or more embodiments, the at least one action includes at least one of triggering of an aperiodic channel state information, CSI, report and scheduling of a physical downlink shared channel, PDSCH. Having generally described arrangements for indicating a downlink control channel based wake-up signal for at least one wireless device 22 before at least one ON duration of the at least one wireless device 22, details for these arrangements, functions and processes are provided as follows, and which may be implemented by the network node 16, wireless device 22 and/or host computer 24.

Embodiments provide a network identifier for indicating a downlink control channel based wake-up signal for at least one wireless device before at least one ON duration of the at least one wireless device 22.

Figure 12:
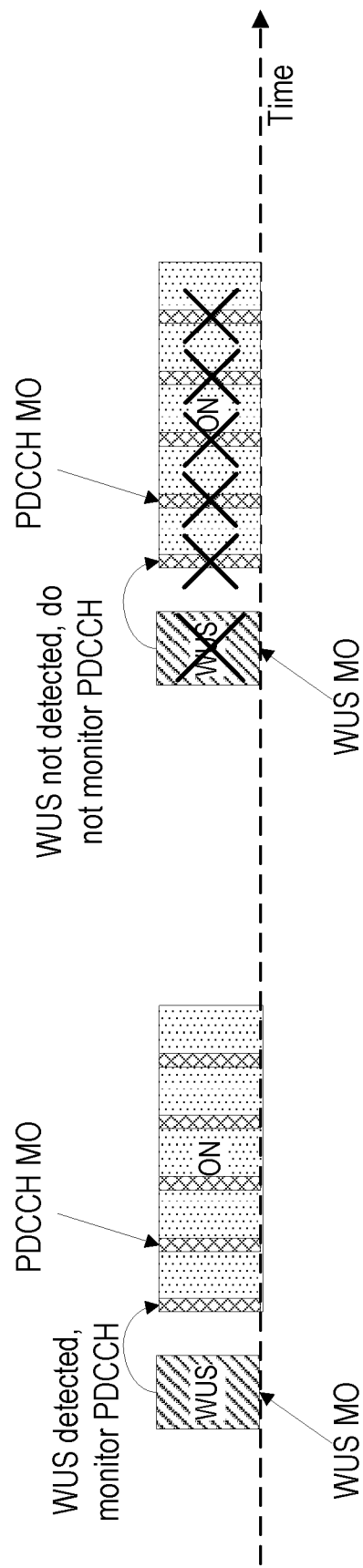
FIG. 12 is a block diagram of an example of wireless device actions based on detection/non-detection of WUS.

An embodiment if provided in which the wireless device 22 is configured, such as by such as via one or more of processing circuitry 68, processor 70, radio interface 62, signaling unit 32, etc., of the network node 16, with one or more WUS Monitoring Occasions (MOs), that occur a pre-determined amount of time (e.g., predefined quantity of X slots) before an ON duration of the wireless device 22. The WUS is based on a signal sent by the network node 16 to the wireless device 22 over PDCCH using an existing or a new DCI format. The wireless device 22, via processing circuitry 84 and/or monitoring unit 34, decodes the DCI. The wireless device 22 can use a receiver and/or radio interface 82 based on PDCCH decoding or other types of receiver, e.g., correlation based receivers. If the WUS is configured for waking up that wireless device 22 (specifically or as part of a group), the wireless device 22, via processing circuitry 84 and/or monitoring unit 34, monitors PDCCH at PDCCH monitoring occasion (MOs) during the next ON duration, or follows network/network node 16 configured/commanded actions upon detection of WUS (e.g., an aperiodic CSI report, scheduling a PDSCH through WUS, etc.). Otherwise, if the wireless device 22 does not detect and/or fails to detect/decode a WUS, the wireless device 22 such as via one or more of processing circuitry 84, processor 86, radio interface 82, monitoring unit 34, etc., can skip monitoring PDCCH in the next occasion, or follow other types of network/network node 16 configured/commanded operation upon non-detection of WUS, e.g., monitoring PDCCH in a different search space (SS) than the regular one and with a longer periodicity. FIG. 12 illustrates an example of wireless device 22 actions upon detection (or not detection/failure to detect) of WUS.

In one or more embodiments that are related to configuration of PDCCH based WUS are detailed below. As used herein, a network identifier may refer to one or more RNTIs described herein and/or another type of identifier that is capable of providing the functionality of the RNTIs described herein. As used herein, the ON duration may refer to a duration of a DRX/CDRX cycle where the wireless device 22 is configured to monitor one or more channels such as a control channel, as is known in the art.

Aspect 1: GW-RNTI Configuration

Since WUS is sent over/using PDCCH, it may be important to configure with which RNTI the related DCI is transmitted over PDCCH.

In one or more embodiments, a wireless device 22 can be configured, by the network node 16 such as via one or more of processing circuitry 68, processor 70, radio interface 62, signaling unit 32, etc., via control signaling for example, with one or more Radio Network Temporary Identifiers (RNTIs) for receiving messages including control/data messages. Some RNTIs are used for broadcast messages.

Figure 13:
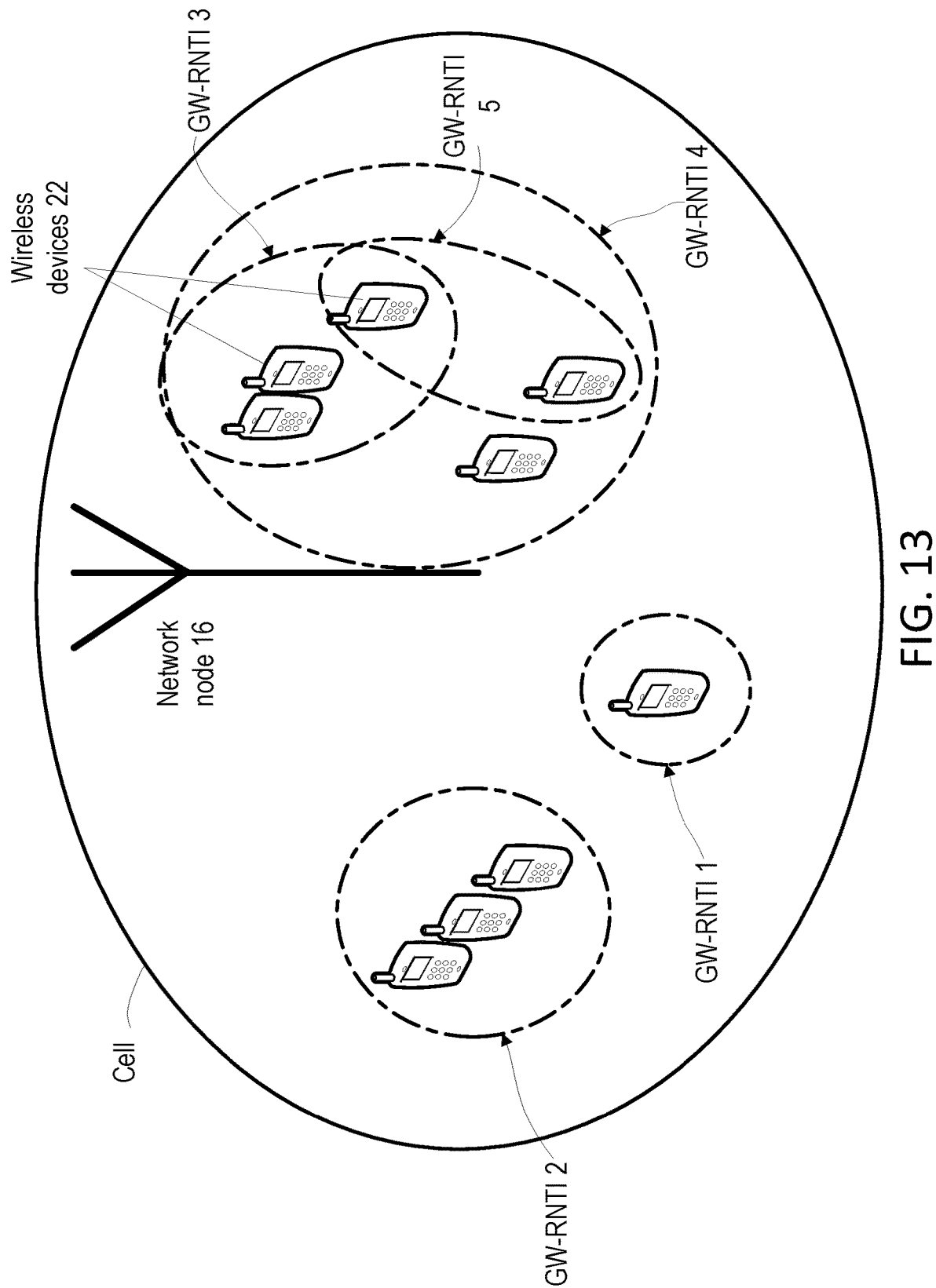
FIG. 13 is a diagram of a schematic example of GW-RNTI distribution.

For WUS carried by PDCCH, a new RNTI is defined herein to address a group of wireless devices 22 for PDCCH based WUS operation, called group WUS RNTI, or GW-RNTI. GW-RNTI can be used to address a single wireless device 22, or a group of wireless devices 22 or all the wireless devices 22 within a cell. In one embodiment, a single WUS, identified with an RNTI that is common to all wireless devices 22 in a cell may be provided/used/communicated to all wireless devices 22 for some ON-durations where several wireless devices 22 or wireless device 22 groups may need to be addressed. Control channel blocking can be reduced by using a cell-common RNTI instead of when individual or group WUSs are used. FIG. 13 illustrates a schematic example of GW-RNTI among different wireless devices 22. A wireless device 22 can be associated (or configured) such as via one or more of processing circuitry 68, processor 70, radio interface 62, signaling unit 32, etc., with more than one GW-RNTI as illustrated in FIG. 13.

In one or more embodiments, the wireless device 22 is configured such as via one or more of processing circuitry 68, processor 70, radio interface 62, signaling unit 32, etc., with a logical wake-up channel, WUCH, via RRC configuration and/or reconfiguration. The WUCH is then mapped such as via one or more of processing circuitry 68, processor 70, radio interface 62, signaling unit 32, etc., to PDCCH or can be carried by the PDCCH, i.e., a PDCCH-based WUS, and is identified by scrambling a CRC with a predefined RNTI, e.g., the GW-RNTI described here. The predefined RNTI can be explicitly configured by higher layers, i.e., higher communication layers, such as via one or more of processing circuitry 68, processor 70, radio interface 62, signaling unit 32, etc. Upon detection such as via one or more of processing circuitry 84, processor 86, radio interface 82, monitoring unit 34, etc., of a PDCCH based WUS or WUCH associated with GW-RNTI, the wireless device 22 such as via one or more of processing circuitry 84, processor 86, radio interface 82, monitoring unit 34, etc. performs one or more specific actions. In one action, the wireless device 22, via processing circuitry 84 and/or monitoring unit 34 and/or radio interface 82, monitors PDCCH in the next ON duration of the wireless device 22. In another embodiment, the action includes the wireless device 22 following network configured set of actions, if a DCI format associated with GW-RNTI is detected.

To identify the WUCH/WUS or PDCCH-based WUS, or the WU function in general, for one or more wireless devices 22, the network node 16 such as via one or more of processing circuitry 68, processor 70, radio interface 62, signaling unit 32, etc., can select the GW-RNTI from the range of 0001-FFEF assigned to most of RNTIs (except P-RNTI and SI-RNTI) or use the reserved field of FFF0-FFFD.

As mentioned above, the GW-RNTI can be configured by the network node 16 such as via one or more of processing circuitry 68, processor 70, radio interface 62, signaling unit 32, etc., to address a single wireless device 22, a group of multiple wireless devices 22, or all of the wireless devices 22 within a cell.

In cases where the GW-RNTI addresses a single wireless device 22, the GW-RNTI can be configured such as via one or more of processing circuitry 68, processor 70, radio interface 62, signaling unit 32, etc., to be the same as the wireless device 22's C-RNTI (or other current wireless device 22 specific RNTIs such as CS-RNTI) for that specific wireless device 22, or related to another wireless device 22 specific RNTI, e.g., a specific function of C-RNTI.

GW-RNTI may be useful to address a group of multiple wireless devices 22. Multiple wireless device 22 can be grouped together such as via one or more of processing circuitry 68, processor 70, radio interface 62, signaling unit 32, etc., in different ways. In one embodiment, excessive use of RNTI resources for GW-RNTI purposes may be avoided by reusing same GW-RNTI among user/wireless device 22 groups associated with disjoint WUS occasions. In other words, the wireless device 22 uses both its WUS occasion (possible T, F allocation) info and the GW-RNTI to detect a WUCH/WUS meant for the wireless device 22—both occasion monitoring parameters and RNTI may match in order to detect a WUS such as via one or more of processing circuitry 84, processor 86, radio interface 82, monitoring unit 34, etc. In another embodiment, the wireless devices 22 which may have to be woken up in the same ON duration can be grouped together. However, this is a special case, and may be useful when there are limited number of RNTIs to assign, or for specific use cases, e.g., multicasting use case.

In some embodiments, a GW-RNTI could be assigned such as via one or more of processing circuitry 68, processor 70, radio interface 62, signaling unit 32, etc., to a subset of wireless device 22 that share the same ON-duration and/or WUS occasion, i.e., a certain ON-duration or WUS occasion may be signaled separately to multiple sub-groups of wireless devices 22 associated with that occasion, leading to a small number of wireless devices 22 being alerted.

In one embodiment, a wireless device 22 such as via one or more of processing circuitry 84, processor 86, radio interface 82, monitoring unit 34, etc. is configured to monitor a first RNTI and a second RNTI on the same WUCH or PDCCH based WUS. Upon detection of the first RNTI, the wireless device 22 can assume such as via one or more of processing circuitry 84, processor 86, radio interface 82, monitoring unit 34, etc., a DCI format that carries scheduling information of PDSCH/PUSCH. Upon detection of the second RNTI, the wireless device 22 such as via one or more of processing circuitry 84, processor 86, radio interface 82, monitoring unit 34, etc. monitors PDCCH in search space(s) in a later time (e.g., at a time after detection of the second RNTI) according to a second configuration. The second RNTI can be a GW-RNTI. In yet another embodiment, the wireless device 22 can be configured with a third RNTI such as via one or more of processing circuitry 68, processor 70, radio interface 62, signaling unit 32, etc., and upon detection of the third RNTI such as via one or more of processing circuitry 84, processor 86, radio interface 82, monitoring unit 34, etc., the wireless device 22 such as via one or more of processing circuitry 84, processor 86, radio interface 82, monitoring unit 34, etc., monitors PDCCH in search space(s) in a later time (e.g., at a time after detection of the third RNTI) according to a third configuration. The third RNTI can be another GW-RNTI.

A wireless device 22 can have several different GW-RNTI, i.e., a wireless device 22 can be configured such as via one or more of processing circuitry 68, processor 70, radio interface 62, signaling unit 32, etc., to belong to several WUS groups. In one of the embodiments, GW-RNTI is calculated based on system timing, e.g., slot number, SFN. In another embodiment, higher layers configure the wireless device 22 with GW-RNTI e.g., through RRC dedicated signaling, MAC, etc.

Aspect 2: WUS Occasion Offset for GW-RNTI

This aspect relates to embodiments in which a PDCCH based WUS is used at a predetermined time (e.g., X slots) before the ON duration to wake-up the wireless device 22. The network node 16 can configure such as via one or more of processing circuitry 68, processor 70, radio interface 62, signaling unit 32, etc., the wireless device 22 to monitor WUS in specific offsets before the ON duration, e.g., X slots before the ON duration where X may be an integer such as a positive integer and/or nonnegative integer.

Figure 14:
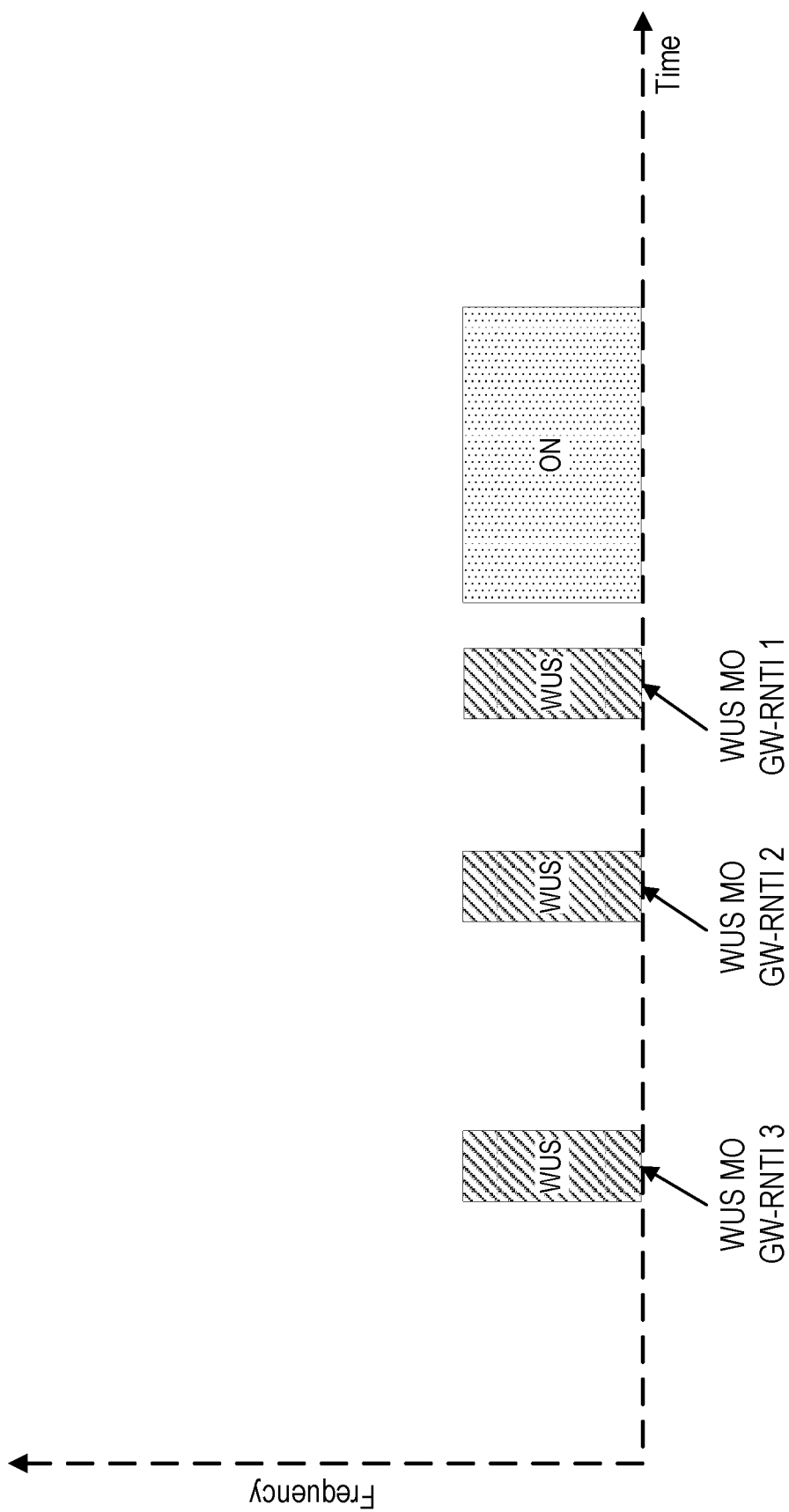
FIG. 14 is a diagram of a WUS MOs offset distribution in time.

Since the network resources may be limited, in one or more embodiments, the network node 16 can distribute the wireless devices 22 in different time offsets with the ON duration. In doing so, the wireless devices 22 with the same GW-RNTI can be configured also with the same offsets with the ON duration (e.g., as illustrated in FIG. 14). However, if the wireless devices 22 with the same GW-RNTI have slightly different ON durations, the offset for each wireless device 22 can be configured individually to be able to address all of the wireless devices 22 in one PDCCH based WUS.

In one or more embodiments, if the size of the group of wireless devices 22 with the same GW-RNTI is large, different subgroups can be shaped such as via one or more of processing circuitry 68, processor 70, radio interface 62, signaling unit 32, etc., with different WUS MO offsets.

Figure 15:
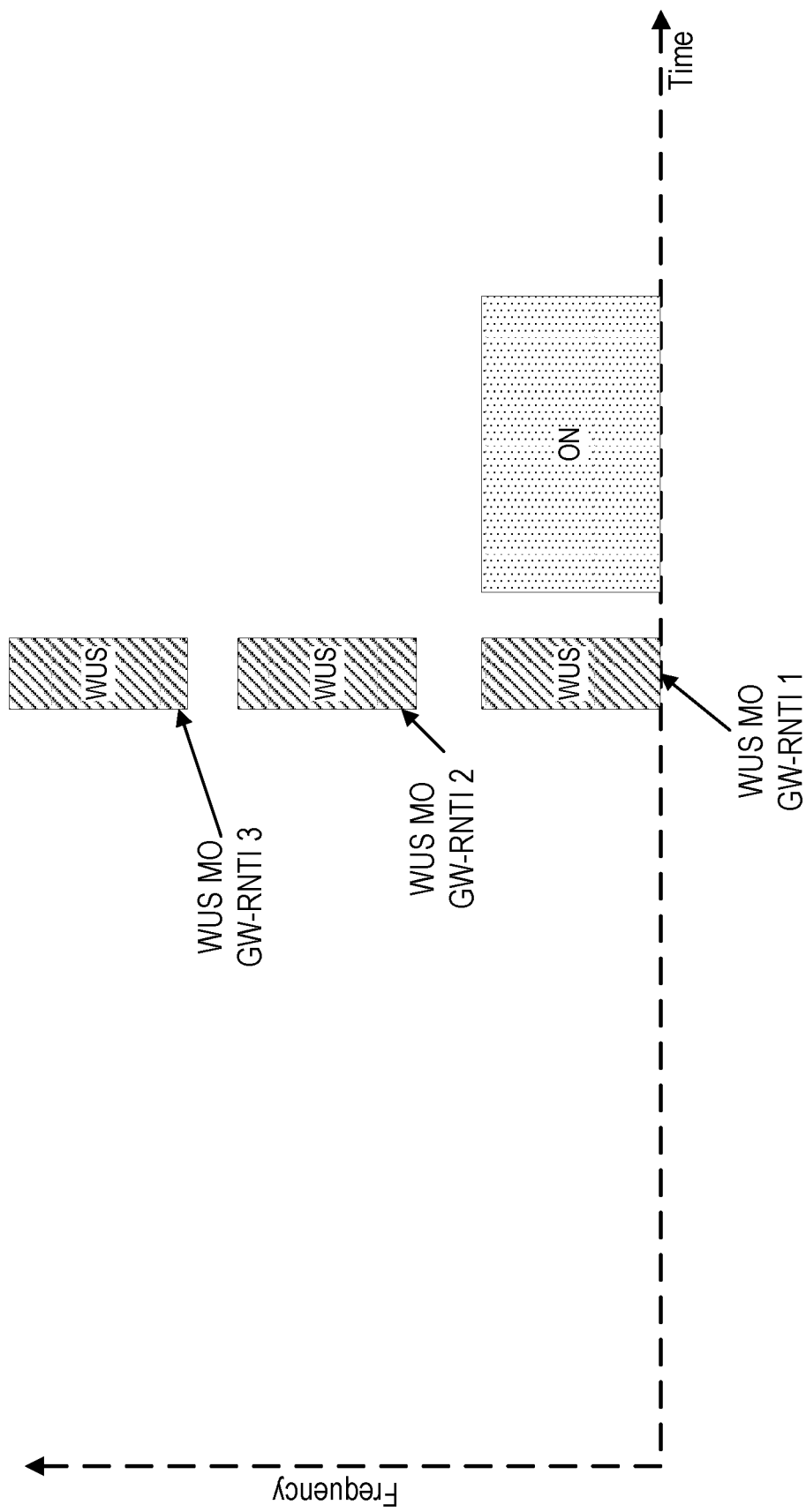
FIG. 15 is a diagram of an example of WUS MOs distribution in frequency.

Alternatively, wireless devices 22 with the similar GW-RNTIs can also be multiplexed in different frequency regions (e.g., different frequency offsets) such as via one or more of processing circuitry 68, processor 70, radio interface 62, signaling unit 32, etc. In one or more embodiments, a frequency offset is relative to the frequency upon which PDCCH monitoring is performed during DRX ON duration. This is particularly useful as it may be more useful to have the WUS occasion as close as possible the ON duration to improve the wireless device 22 throughput and reduce wireless device 22 energy consumption. An example is depicted in FIG. 15.

Figure 16:
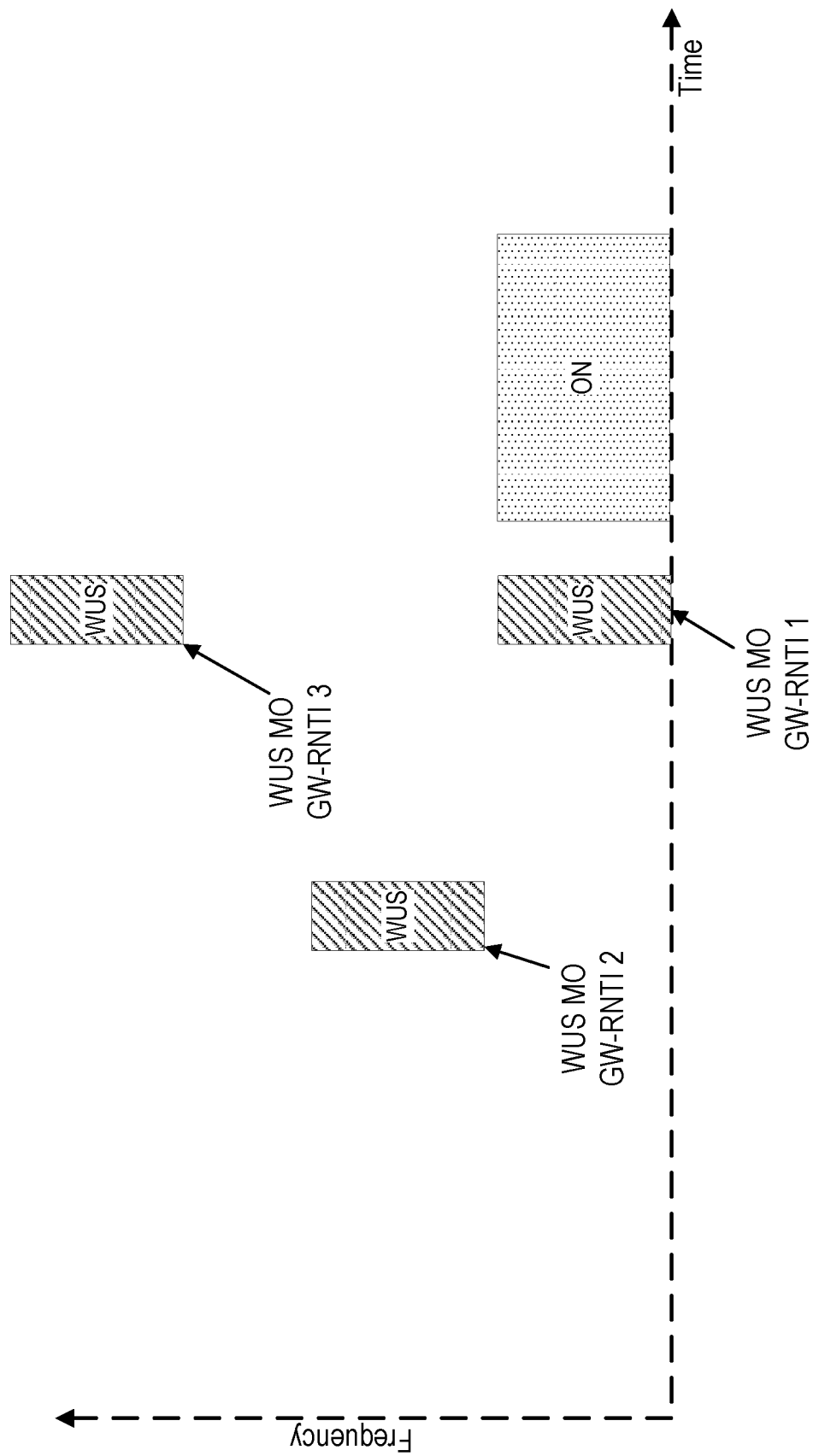
FIG. 16 is a diagram of an example of WUS MOs distribution in time and frequency.

Additionally, a combination of above approaches/embodiments can be used, i.e., to distribute the WUS MOs both in time and frequency. An example is depicted in FIG. 16.

Aspect 3: WUS DCI Format/Core Resource Set (CORE-SET)/Search Space (SS) and GW-RNTI This aspect addresses which DCI format the WUS may be based on for WUS operation.

In one or more embodiments, the WUS can be based on existing DCI formats (e.g. 0-0/0-1/1-0/1-1). In such cases, if the wireless device 22 such as via one or more of processing circuitry 84, processor 86, radio interface 82, monitoring unit 34, etc. decodes the GW-RNTI, then the wireless device 22 can consider this as an indication that the associated DCI is a WUS. In one or more embodiments, the GW-RNTI (defined to address a group of wireless devices) may be configured to be associated with a specific DCI format defined to address a group of wireless devices 22 for PDCCH based wake-up signal operation.

In one or more embodiments, a new and potentially compact DCI format can be developed specifically for WUS. For example, the new and potentially compact DCI format may be different from existing DCI formats such as 0-1, 0-1, 1-0 and 1-1. Such a DCI may be specifically associated with GW-RNTI as an indication, and then, in one or more embodiments, some additional bits to include additional commands, or making space for future extensions. In one or more embodiments, the new DCI format may have to exist with the current ones in the same occasion where the new DCI format may correspond to a quantity of bits less than existing DCI formats, and the zero padding can be used to equalize the size of the new DCI format with existing DCI formats. In such cases, the bits before zero padding may be considered information bits, while zero padding bits may considered bits or non-information bits as these bits may not be configured to carry information and may only be used for DCI size reasons.

In one or more embodiments where using existing DCI formats or a new DCI format, if payload bits are available in the PDCCH, then those could represent info to subgroups of wireless device 22 sharing the same GW-RNTI. In other words, using a single DCI addressed to group of wireless devices 22, the DCI could contain a bitmap with wakeup information for a subgroup of wireless devices 22. Typically, in DCI, for a wireless device 22, there can be three types of bits—1) bits with information relevant to the wireless device 22, 2) bits with information fields not relevant to the wireless device 22 ('reserved'), 3) Known bits (wireless device 22 knows value(s) of these bits in advance such as Padding). Then for wake up (WU), the wireless device 22 may need to receive information about where item 1) is located within the DCI, and possibly item 3) to take advantage in improving decoding. Note item 3) can be avoided by using compact DCI instead. Table 1 depicts an example of this embodiment. In one example, B0-B3 may include wakeup information for subgroup 1 that indicates that subgroup 1 is selected to implement the WUS, i.e., perform the tasks according to information (i.e., wakeup information) conveyed in the WUS. In one or more embodiments, as used herein, implement the WUS may generally refer to perform at least one task according to information conveyed in the WUS.

TABLE 1

An example of bitmap to different subgroup of wireless devices with the same GW-RNTI Example 1:
Fields in DCI 1_0 with configured GW-RNTI for a group of WDs
B0-B1 - wakeup info for subgroup 1
B2-B3 - wakeup info for subgroup 2
. . .
B10-B11 - wakeup info for subgroup 6
Remaining bits of DCI 1_0 - Known
24-bit CRC For example, B0-B1=00 can indicate no wakeup, 01 can indicate wakeup and monitor according to configuration 1, 10 can indicate wakeup and monitor according to configuration 2 and 11 can indicate wakeup and monitor according to configuration 3. Some examples of a subgroup are as follows:

A subgroup can be one wireless device 22.
A subgroup can be two wireless devices 22.
A subgroup can be a set of wireless devices 22 that have the same On duration.

Yet another aspect to address with regard to WUS configuration, particularly considering GW-RNTI, is the aspect related to the PDCCH blind decoding (BD), which in turn relates to control resource set (CORESET)/search space (SS) configuration. In general, a PDCCH MO is composed of time/frequency components within which the wireless device 22 monitors PDCCH and tries/attempts to detect it by blind decoding. A PDDCH MO is generally configured by association of a CORESET and a SS. In other words, a CORESET is a time/frequency resource within which the wireless device 22 tries/attempts to decode candidate control channels using one or more SS, and where a SS is a set of candidate control channels that the wireless device 22 is supposed and/or configured to attempt to decode, the SS having a specific periodicity, aggregation level, etc.

In one embodiment, the network node 16 such as via one or more of processing circuitry 68, processor 70, radio interface 62, signaling unit 32, etc., can ensure that a group of wireless devices 22 searching for WUS share the same CORESET configuration (particularly if the group shares the same GW-RNTI). This can be achieved by using common search space (defined in 3GPP Rel-15) to send WUS, and may be difficult (or not always feasible) if it is sent in WD-specific search space (defined in 3GPP Rel-15) with hashing based on the wireless device 22's C-RNTI (=>difficult to ensure different wireless devices 22 can look at same candidate always). Employing CSS is possible, but with WUS, more functionality needs to be supported on CSS, which is typically used for SI/P/RA messages and for fallback. "group"-common search space with hashing based on new GW-RNTI is an additional option.

One way to efficiently utilize the bits in the DCI is to have a bitmap where each bit indicates whether or not a specific subgroup of wireless devices 22 sharing the same GW-RNTI is targeted with the WUS. The bitmap allows to down select one or more subgroups within that GW-RNTI. In another word, using a single DCI addressed to group of wireless devices 22, the DCI could contain a bitmap with wakeup information for a subgroup of wireless devices 22. An example is given below in Table 2. In Table 2, bits B0-B5 provide the possibility to address one or more of size subgroup, and the optional bitfield B6-B11 provides wakeup information for the targeted group(s).

TABLE 2

An example of bitmap to different subgroup of wireless devices 22 with the same GW-RNTI Example 2:
Fields in DCI 1_0 with configured GW-RNTI for a group of WDs
B0-B5 - Bitmap indicating which of subgroups 1-6 are targeted
B6-B11 - wakeup info for targeted subgroup(s)
Remaining bits of DCI 1_0 - Known
24-bit CRC Aspect 4: Wireless Device 22 Behavior in Conjunction with WUS Detection As described above, the wireless device 22 such as via one or more of processing circuitry 84, processor 86, radio interface 82, monitoring unit 34, etc., monitors PDCCH based WUS/WUCH in a WUS MOs. In case a PDCCH WUS associated with a GW-RNTI, or a DCI format associated with a GW-RNTI is detected such as via one or more of processing circuitry 84, processor 86, radio interface 82, monitoring unit 34, etc., then the in one embodiment, the wireless device 22 such as via one or more of processing circuitry 84, processor 86, radio interface 82, monitoring unit 34, etc., monitors PDCCH in the next ON duration with network pre-configured PDCCH MOs. In another embodiment, the WUS itself may contain/include additional information/commands, e.g., triggering an aperiodic CSI report, or scheduling the first PDSCH, and so on, which may be implemented by the wireless device 22 such as via one or more of processing circuitry 84, processor 86, radio interface 82, monitoring unit 34, etc.

On the other hand, if the wireless devices 22 does not detect such as via one or more of processing circuitry 84, processor 86, radio interface 82, monitoring unit 34, etc., a PDCCH WUS/WUCH or a DCI format associated with a GW-RNTI, the wireless device 22 such as via one or more of processing circuitry 84, processor 86, radio interface 82, monitoring unit 34, etc., can skip monitoring PDCCH in the next ON duration, or follow other pre-configured actions by the network. For example, the network node 16 such as via one or more of processing circuitry 68, processor 70, radio interface 62, signaling unit 32, etc., can configure a different SS with a longer periodicity such that if WUS is not detected as described herein, then the wireless device 22 such as via one or more of processing circuitry 84, processor 86, radio interface 82, monitoring unit 34, etc., monitors PDCCH in that SS, or if the wireless device 22 notes/determines such as via one or more of processing circuitry 84, processor 86, radio interface 82, monitoring unit 34, etc., that the channel conditions have deteriorated, and non-detection of WUS can be related to that, then the wireless device may have to wake-up and so on.

Aspect 5: WUCH/WUS False Alarm Mitigation

Introduction of group RNTIs for WUCH/WUS detection may create a false alarm phenomenon, conceptually similar to paging using P-RNTI, whereby the wireless device 22 such as via one or more of processing circuitry 84, processor 86, radio interface 82, monitoring unit 34, etc., detects the WUS and the WUCH with its configured GW-RNTI, but the ON-duration assisted with the WUS does not contain a PDCCH with the C-RNTI of the wireless device 22 and associated data. This aspect may be distinguished from WUS false alarm where a PDCCH-WUS is detected by the wireless device 22 such as via one or more of processing circuitry 84, processor 86, radio interface 82, monitoring unit 34, etc., when the WUS was actually not transmitted by the network node 16.

Reducing the group size per unique GW-RNTIs reduces the false alarm probability but may increase the number of required GW-RNTI entries and the number of WUS to be transmitted on the average. In order to help maintain a desirable trade-off between false alarm and WUS load and capacity, the network node 16 may consider and use such as via one or more of processing circuitry 68, processor 70, radio interface 62, signaling unit 32, etc., e.g., one or more of:
- the number of available GW-RNTI entries and the possibility for GW-RNTI reuse as described herein,
- the maximum expected number of wireless devices 22 to be scheduled during one ON-duration and the maximum number of simultaneous WUS that can be transmitted, and the resulting WUS blocking probability,
- the resulting false WUS detection probability by a wireless device 22.

The desirable trade-off may depend on one or more of the network load, scheduling robustness, and wireless device 22 energy savings priorities in a given deployment or network architecture and design.

Additional Aspects:

In one or more embodiments, one or more mechanisms related to PDCCH based WUS/WUCH and GW-RNTI, may be particularly associated with a WUS with offset to ON duration, are described. The same principles described herein can be applied to the other possible PDCCH based power saving signals, e.g., GTS, PDCCH-based skipping indicator, etc., before or during the ON duration.

In one or more embodiments, the WUCH for a given wireless device 22 may be associated with both the C-RNTI of the wireless device 22 (or a function of it) and a GW-RNTI, or multiple GW-RNTIs such as via one or more of processing circuitry 68, processor 70, radio interface 62, signaling unit 32, etc. One possible configuration may be to have one GW-RNTI equal to C-RNTI, one specifying a subgroup of wireless devices 22 sharing an On-duration, and one specifying any/all wireless devices 22 in the cell. Then, upon decoding the PDCCH-WUS such as via one or more of processing circuitry 84, processor 86, radio interface 82, monitoring unit 34, etc., the wireless device 22 checks the CRC using multiple scrambling hypotheses and declares a detected WUS and monitors the associated ON-duration if any of the relevant RNTIs lead to a successful CRC check.

Some Examples

Example A1. A network node 16 configured to communicate with a wireless device 22 (WD 22), the network node 16 configured to, and/or comprising a radio interface 62 and/or comprising processing circuitry 68 configured to:
determine a network identifier for indicating a downlink control channel based wake-up signal for at least one wireless device 22; and
optionally cause transmission of the network identifier to the at least one wireless device 22.

Example A2. The network node 16 of Example A1, wherein the downlink control channel based wake-up signal is configured to be implemented before an ON duration of a discontinuous reception cycle of the at least one wireless device 22.

Example A3. The network node 16 of Example A1, wherein the wake-up signal is based at least in part on a downlink control information (DCI) format that indicates a group of wireless devices 22; and
the network identifier being a Radio Network Temporary Identifier (RNTI).

Example B1. A method implemented in a network node 16, the method comprising:
determining a network identifier for indicating a downlink control channel based wake-up signal for at least one wireless device 22; and
optionally causing transmission of the network identifier to the at least one wireless device 22.

Example B2. The method of Example B1, the downlink control channel based wake-up signal is configured to be implemented before an ON duration of a discontinuous reception cycle of the at least one wireless device 22.

Example B3. The method of Example B1, wherein the wake-up signal is based at least in part on a downlink control information (DCI) format that indicates a group of wireless devices 22; and
the network identifier being a Radio Network Temporary Identifier (RNTI).

Example C1. A wireless device 22 (WD 22) configured to communicate with a network node 16, the WD 22 configured to, and/or comprising a radio interface 82 and/or processing circuitry 84 configured to:
monitor, before an ON duration of a discontinuous reception cycle, for a network identifier that indicates a downlink control channel based wake-up signal; and
optionally perform at least one function if the network identifier is detected.

Example C2. The WD 22 of Example C1, wherein the wake-up signal is based at least in part on a downlink control information (DCI) format that indicates a group of wireless devices 22.

Example C3. The WD 22 of Example C1, wherein the network identifier is a Radio Network Temporary Identifier (RNTI) that is associated with a plurality of wireless devices 22.

Example D1. A method implemented in a wireless device 22 (WD 22), the method comprising:
monitoring, before an ON duration of a discontinuous reception cycle, for a network identifier that indicates a downlink control channel based wake-up signal; and
optionally performing at least one function if the network identifier is detected.

Example D2. The method of Example D1, wherein the wake-up signal is based at least in part on a downlink control information (DCI) format that indicates a group of wireless devices 22.

Example D3. The method of Example D1, wherein the network identifier is a Radio Network Temporary Identifier (RNTI) that is associated with a plurality of wireless devices 22.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware.

Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
3GPP $3^{rd}$ Generation Partnership Project
5G $5^{th}$ Generation
BB Baseband
BW Bandwidth
CDRX Connected mode DRX (i.e. DRX in RRC_CONNECTED state)
CRC Cyclic Redundancy Check
DCI Downlink Control Information
DL Downlink
DRX Discontinuous Reception
gNB A radio base station in 5G/NR.
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:
1. A network node, configured to:
configure each wireless device in a first group of wireless devices comprising at least one wireless device with a first radio network temporary identifier, RNTI, defined to address a group of wireless devices for physical downlink control channel, PDCCH, based wake-up signal, WUS, operation; and cause transmission of signaling including a wake-up signal, WUS, for a first WUS monitoring occasion associated with the first group of wireless devices and use the first RNTI defined to address a group of wireless devices to scramble a Cyclic Redundancy Check, CRC, in the signaling, the WUS configured to cause each wireless device in the first group of wireless devices to perform at least one action.

2. A method implemented by a network node, the method comprising:

configuring each wireless device in a first group of wireless devices comprising at least one wireless device with a first radio network temporary identifier, RNTI, defined to address a group of wireless devices for physical downlink control channel, PDCCH, based wake-up signal, WUS, operation; and causing transmission of signaling including a wake-up signal, WUS, for a first WUS monitoring occasion associated with the first group of wireless devices and using the first RNTI defined to address a group of wireless devices to scramble a Cyclic Redundancy Check, CRC, in the signaling, the WUS configured to cause each wireless device in the first group of wireless devices to perform at least one action.

3. The method of claim 2, wherein the first RNTI defined to address a group of wireless devices is configured via radio resource control, RRC, signaling.

4. The method of claim 2, wherein the first RNTI defined to address a group of wireless devices is associated with a downlink control information, DCI, format that is different from DCI formats 0-0, 0-1, 1-0 and 1-1.

5. The method of claim 2, further comprising configuring the first WUS monitoring occasion for the first group of wireless devices with at least a time offset relative to a first discontinuous reception, DRX, ON duration period.

6. The method of claim 2, further comprising configuring downlink control information, DCI, addressed to the first group of wireless devices, the DCI comprising a bitmap where a first plurality of bits are configured to indicate whether to wake-up a first subgroup of the first group of wireless devices and a second plurality of bits are configured to indicate whether to wake-up a second subgroup of the first group of wireless devices.

7. The method of claim 6, wherein the first subgroup of the first group of wireless devices is associated with a first DRX ON duration period; and the second subgroup of the first group of wireless devices is associated with a second DRX ON duration period.

8. The method of claim 2, further comprising configuring downlink control information, DCI, addressed to the first group of wireless devices, the DCI comprising a bitmap including:

a first plurality of bits indicating which one or more of a plurality of subgroups of the first group of wireless devices that is selected to implement the WUS; and a second plurality of bits indicating information for implementing the WUS.

9. The method of claim 2, further comprising configuring the first group of wireless devices with a first control resource set, CORESET, and first common search space, CSS, configuration for searching for the WUS, the first CORESET and first CSS configuration being associated with the first group of wireless devices.

10. The method of claim 2, wherein the at least one action includes monitoring a physical downlink control channel during a first DRX ON duration period.

11. The method of claim 2, wherein the at least one action includes at least one of triggering of an aperiodic channel state information, CSI, report and scheduling of a physical downlink shared channel, PDSCH.

12. A wireless device configured to communicate with a network node, the wireless device configured to:

obtain a configuration comprising a first radio network temporary identifier, RNTI, defined to address a group of wireless devices for physical downlink control channel, PDCCH, based wake-up signal, WUS, operation;

receive signaling including a wake-up signal, WUS, in a first WUS monitoring occasion associated with a first group of wireless devices that includes at least the wireless device and descramble a cyclic redundancy check, CRC, in the signaling using the first RNTI defined to address a group of wireless devices, the WUS being configured to cause the first group of wireless devices to perform at least one action; and perform the at least one action.

13. A method implemented by a wireless device that is configured to communicate with a network node, the method comprising:

obtaining a configuration comprising a first radio network temporary identifier, RNTI, defined to address a group of wireless devices for physical downlink control channel, PDCCH, based wake-up signal, WUS, operation;

receiving signaling including a wake-up signal, WUS, in a first WUS monitoring occasion associated with a first group of wireless devices that includes at least the wireless device and descrambling a cyclic redundancy check, CRC, in the signaling using the first RNTI defined to address a group of wireless devices, the WUS being configured to cause the first group of wireless devices to perform at least one action; and performing the at least one action.

14. The method of claim 13, wherein the first RNTI defined to address a group of wireless devices is configured via radio resource control, RRC, signaling.

15. The method of claim 13, wherein the first RNTI defined to address a group of wireless devices is associated with a downlink control information, DCI, format that is different from DCI formats 0-0, 0-1, 1-0 and 1-1.

16. The method of claim 13, wherein the first WUS monitoring occasion associated with the first group of wireless devices is offset by at least a time offset relative to a first discontinuous reception, DRX, ON duration period.

17. The method of claim 13, wherein the signaling includes downlink control information, DCI, addressed to the first group of wireless devices, the DCI comprising a bitmap where a first plurality of bits are configured to indicate whether to wake-up a first subgroup of the first group of wireless devices and a second plurality of bits are configured to indicate whether to wake-up a second subgroup of the first group of wireless devices.

18. The method of claim 17, wherein the first subgroup of the first group of wireless devices is associated with a first DRX ON duration period; and the second subgroup of the first group of wireless devices is associated with a second DRX ON duration period.

19. The method of claim 13, wherein the signaling includes downlink control information, DCI, addressed to the first group of wireless devices, the DCI comprising a bitmap including:
- a first plurality of bits indicating which one or more of a plurality of subgroups of the first group of wireless devices that is selected to implement the WUS; and
- a second plurality of bits indicating information for implementing the WUS.

20. The method of claim 13, further comprising using a first control resource set, CORESET, and first common search space, CSS, configuration to search for the WUS, the first CORESET and first CSS configuration being associated with the first group of wireless devices.

21. The method of claim 13, wherein the at least one action includes monitoring a physical downlink control channel during a first DRX ON duration period.

22. The method of claim 13, wherein the at least one action includes at least one of triggering of an aperiodic channel state information, CSI, report and scheduling of a physical downlink shared channel, PDSCH.

\* \* \* \* \*